(12) United States Patent
Hirata

(10) Patent No.: US 7,591,781 B2
(45) Date of Patent: Sep. 22, 2009

(54) ENDOSCOPE SYSTEM WITH INSERTION DIRECTION CHANGING GUIDES

(75) Inventor: Yasuo Hirata, Tokyo (JP)

(73) Assignee: Olympus Corporation (JP)

( * ) Notice: Subject to any disclaimer, the term of this patent is extended or adjusted under 35 U.S.C. 154(b) by 143 days.

(21) Appl. No.: 10/621,086

(22) Filed: Jul. 15, 2003

(65) Prior Publication Data

US 2004/0019252 A1 Jan. 29, 2004

(30) Foreign Application Priority Data

Jul. 15, 2002 (JP) .............................. 2002-205824
Jul. 22, 2002 (JP) .............................. 2002-212853

(51) Int. Cl.
*A61B 1/00* (2006.01)
*A61B 1/04* (2006.01)
(52) U.S. Cl. ...................................... 600/114; 600/139
(58) Field of Classification Search ................. 600/114, 600/115, 101, 146, 121, 139–140; 606/108
See application file for complete search history.

(56) References Cited

U.S. PATENT DOCUMENTS

| | | | | |
|---|---|---|---|---|
| 4,449,532 | A * | 5/1984 | Storz ........................... | 606/191 |
| 4,976,191 | A | 12/1990 | Suzumori et al. | |
| 5,577,992 | A | 11/1996 | Chiba et al. | |
| 5,607,435 | A * | 3/1997 | Sachdeva et al. ............. | 606/139 |
| 6,234,958 | B1 * | 5/2001 | Snoke et al. ................ | 600/114 |
| 6,605,033 | B1 * | 8/2003 | Matsuno ..................... | 600/107 |
| 6,726,677 | B1 * | 4/2004 | Flaherty et al. ............. | 604/528 |
| 6,890,295 | B2 * | 5/2005 | Michels et al. .............. | 600/114 |
| 2003/0216616 | A1 * | 11/2003 | Krupa et al. ................. | 600/140 |

FOREIGN PATENT DOCUMENTS

| | | |
|---|---|---|
| JP | 52-90086 | 12/1977 |
| JP | 57-79501 | 10/1980 |
| JP | 59-105141 | 7/1984 |
| JP | 62-257050 | 11/1987 |
| JP | 01-229220 | 9/1989 |
| JP | 63-137814 | 4/1990 |

(Continued)

OTHER PUBLICATIONS

Untranslated Office Action issued by Japanese Patent Office on Feb. 5, 2008 in connection with corresponding Japanese application No. 2002-205824.

(Continued)

*Primary Examiner*—John P Leubecker
*Assistant Examiner*—Philip R Smith
(74) *Attorney, Agent, or Firm*—Ostrolenk Faber LLP

(57) ABSTRACT

An endoscope system includes an endoscope and an insertion unit guide member. The endoscope has an elongated insertion unit whose bending section adjoins a distal section thereof. The insertion unit guide member comprises a plurality of tubular members to be placed in a pipe. Each of the tubular members has a guide channel having a predetermined diameter that permits other tubular member or the insertion unit to smoothly pass through the guide channel. The plurality of tubular members has predetermined degrees of flexibility and predetermined lengths. At least one of the tubular members has a member that changes the advancing direction in which the insertion unit is advanced through the guide channel.

8 Claims, 21 Drawing Sheets

FOREIGN PATENT DOCUMENTS

| | | |
|---|---|---|
| JP | 04-081711 | 3/1992 |
| JP | 06-225853 | 8/1994 |
| JP | 11-160629 | 6/1999 |
| JP | 2000-325303 | 11/2000 |
| JP | 2001-258819 | 9/2001 |
| JP | 2001-350104 | 12/2001 |
| JP | 2002-048983 | 2/2002 |

OTHER PUBLICATIONS

Office Action issued by Japanese Patent Office on Dec. 25, 2007 in connection with corresponding Japanese application No. 2002-212853.

* cited by examiner

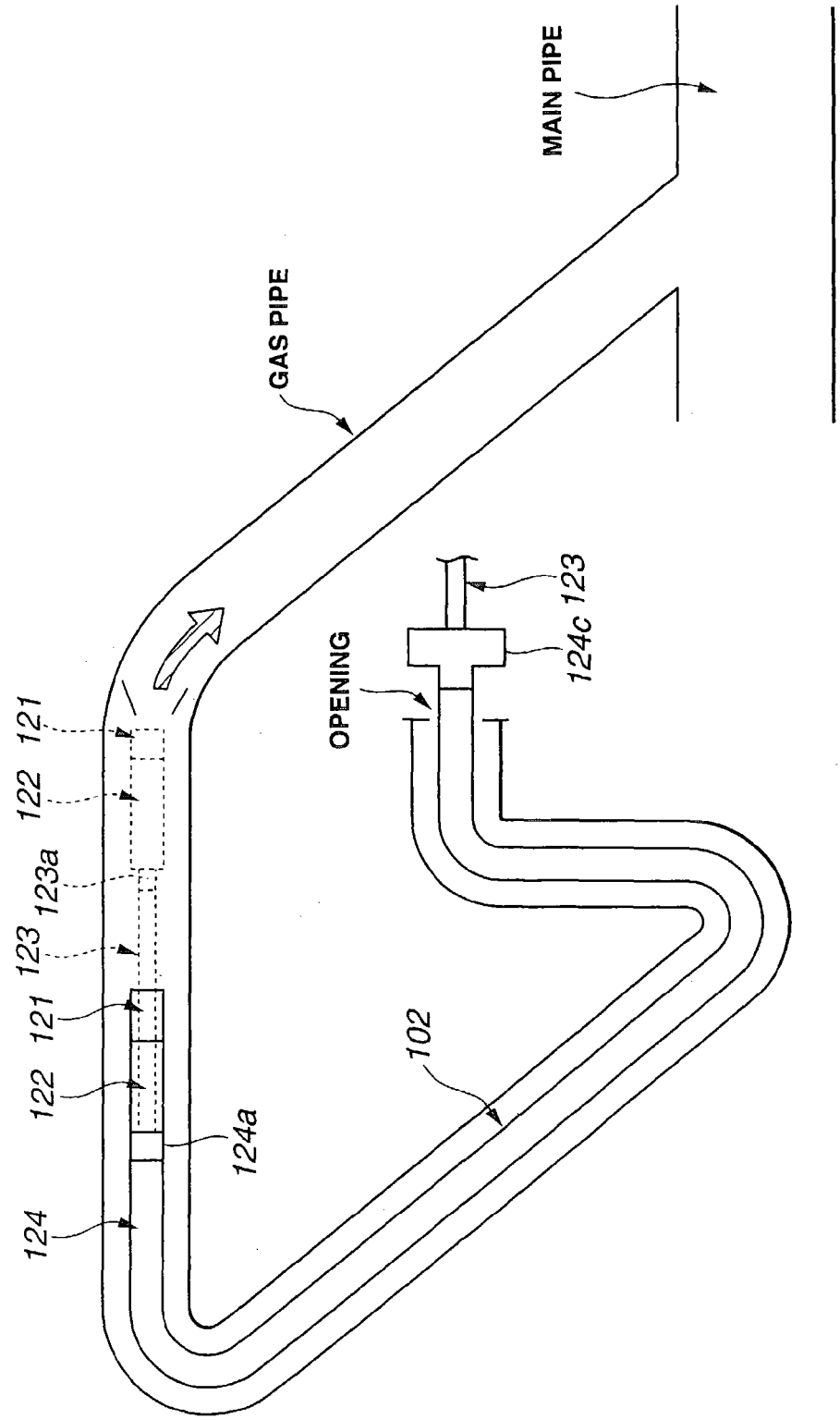

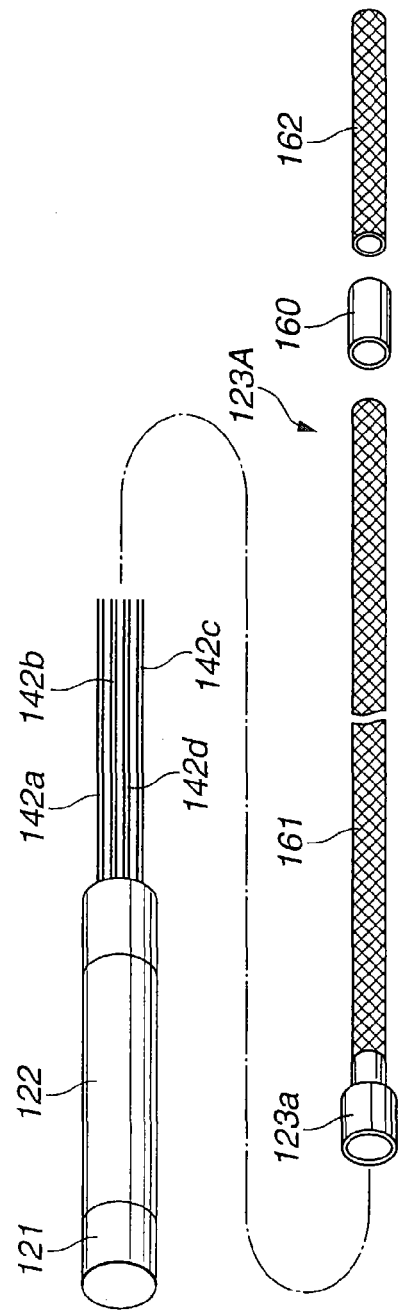
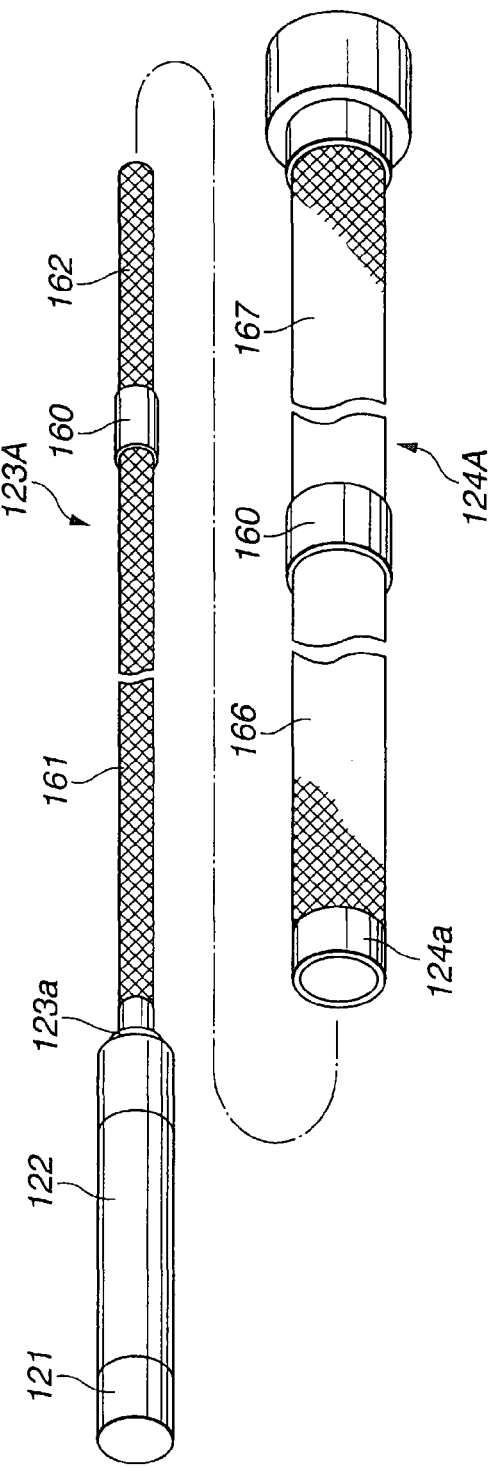
FIG. 17A
FIG. 17B

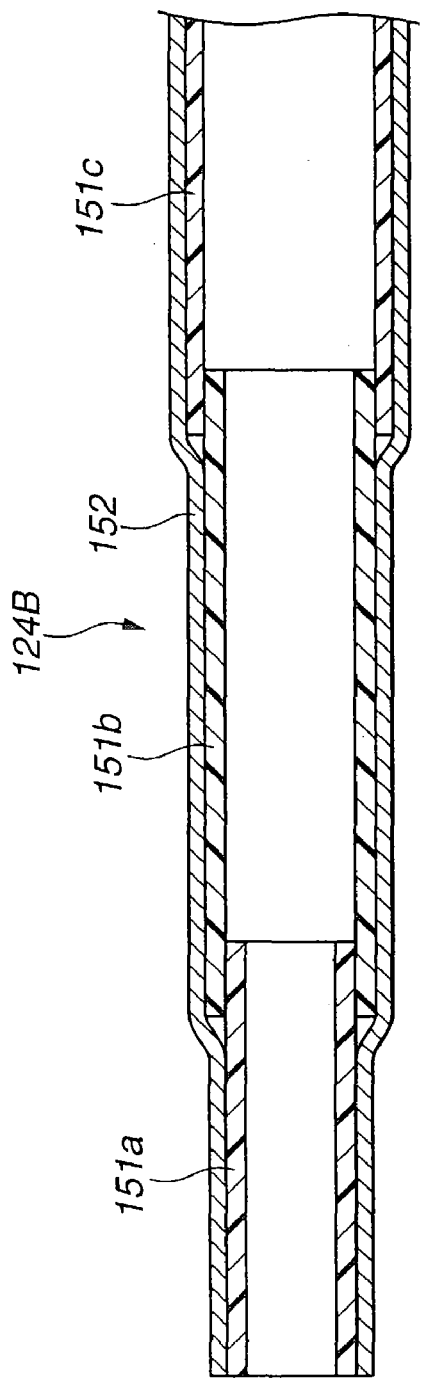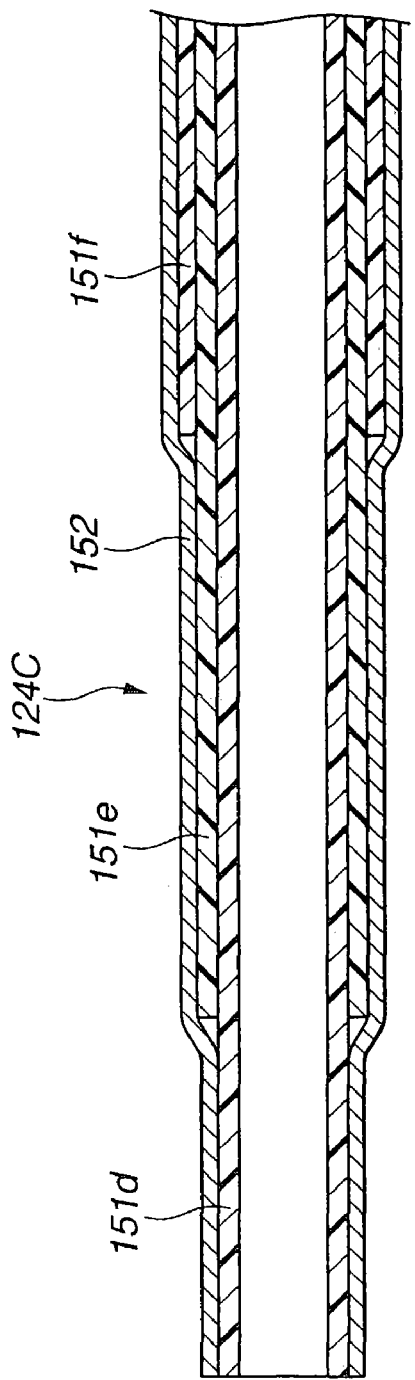

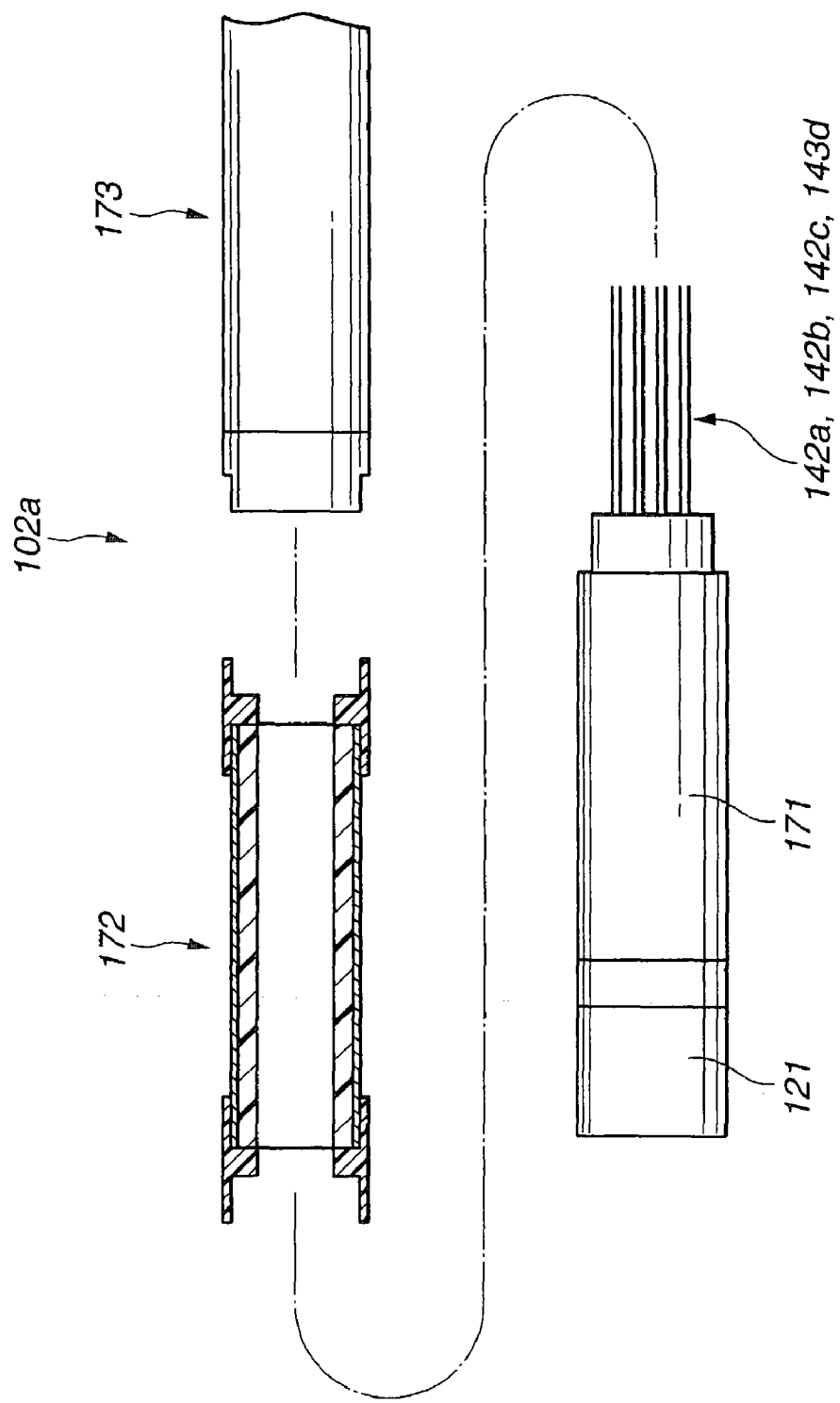

ENDOSCOPE SYSTEM WITH INSERTION DIRECTION CHANGING GUIDES

This application claims the benefit of Japanese Application Nos. 2002-205824 filed on Jul. 15, 2002 and 2002-212853 filed on Jul. 22, 2002, the contents of which are incorporated by reference.

BACKGROUND OF THE INVENTION

1. Field of the Invention

The present invention relates to an endoscope system including an endoscope that has an elongated insertion unit.

2. Description of the Related Art

In general, endoscopes adaptable to industrial use or medical use have an elongated insertion unit that is inserted into a lumen. The insertion unit of this type of endoscope has a bending section formed adjacently to a distal section thereof. By bending the bending section, the endoscope can be angled in any observational direction.

For example, there is the work of inserting the elongated insertion unit of an endoscope for industrial use into the deep end of a tortuous pipe that has a plurality of elbows. During the work, the insertion unit is passed the elbows by adroitly handing the insertion unit, for example, thrusting it, angling it, or twisting it. Consequently, the distal section of the insertion unit reaches a target region, and the target region can be observed.

In the inserting work, if there is a large difference between the inner diameter of a pipe and the outer diameter of the insertion unit, when the insertion unit is thrust, the flexible tube of the insertion unit may warp largely. This makes it hard to adroitly insert the insertion unit into the target region. On the other hand, a user needs expertise until he/she masters the technique of passing several elbows of a pipe, of which inner diameter is slightly larger than the outer diameter of the insertion unit, by adroitly handling the insertion unit.

Consequently, when considered solely workability for insertion, it is preferred to procure an endoscope having an insertion unit whose outer diameter is optimal relative to the inner diameter of a tube.

SUMMARY OF THE INVENTION

An endoscope system includes an endoscope and an insertion unit guide member. The endoscope includes an elongated insertion unit that has a bending section formed adjacently to a distal section thereof. The insertion unit guide member comprises a plurality of tubular members that is placed in a pipe. Each of the tubular members includes a guide channel having a predetermined diameter that permits related tubular member or the insertion unit to smoothly pass through the guide channel. The plurality of tubular members exhibits predetermined degrees of flexibility and has predetermined lengths. At least one tubular member has a distal cover member that serves as a direction changing means for changing the advancing direction in which the insertion unit advances through the guide channel.

The above and other objects of the present invention, and the features and advantages thereof will be more clearly understood from the following description with reference to the accompanying drawings.

BRIEF DESCRIPTION OF THE DRAWINGS

FIG. 1 to FIG. 9B are explanatory diagrams concerning a first embodiment of the present invention;

FIG. 1 is an explanatory diagram showing the configuration of an endoscope system;

FIG. 3 is an explanatory diagram concerning the operation of the insertion unit guide member;

FIG. 7 is an explanatory diagram showing a tubular member having a balloon;

FIG. 9B is a 9B-9B sectional view of the distal cover member shown in FIG. 9A;

FIG. 10 to FIG. 13 are explanatory diagrams concerning a second embodiment;

FIG. 10 is an explanatory diagram showing the configuration of an endoscope system;

FIG. 11 is a perspective view showing the structure of an insertion unit of an endoscope;

FIG. 13 is an explanatory diagram concerning the exemplary structure of the insertion unit of the endoscope;

FIG. 16 is an explanatory diagram concerning the operation of the insertion unit;

FIG. 17A is an explanatory diagram showing another structure of the flexible tube;

FIG. 17B is an explanatory diagram showing another structure of the guide tube;

FIG. 18A is an explanatory diagram concerning the structure of a guide tube having a plurality of tube bodies whose diameters are different from one another;

FIG. 18B is an explanatory diagram concerning the structure of a guide tube having a plurality of tube bodies whose diameters and lengths are different from one another;

FIG. 21 is an explanatory diagram showing another example of the structure of the insertion unit;

DESCRIPTION OF THE PREFERRED EMBODIMENTS

Figure 1:
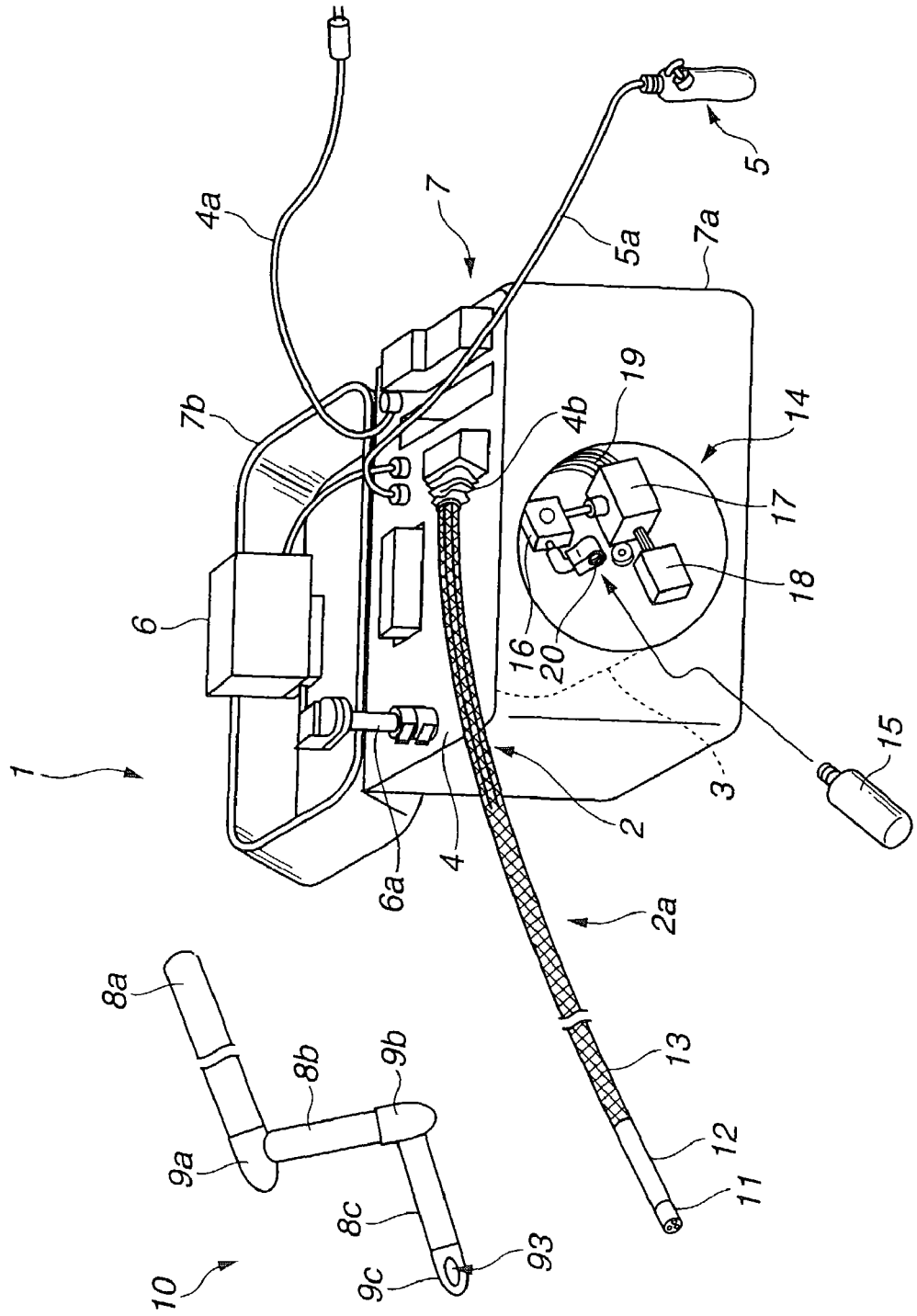

Referring to the drawings, embodiments of the present invention will be described below.

First Embodiment

As shown in FIG. 1, an endoscope system 1 in accordance with the present embodiment comprises an endoscope 2 for, for example, industrial use, a drum 3, a front panel 4, a remote controller 5, a monitor 6, a container case 7, and an insertion unit guide member 10.

The endoscope 2 includes an elongated insertion unit 2a that has flexibility. The drum 3 has a periphery 3a about which the insertion unit 2a is wound. The drum 3 is held in a frame serving as a support, which is not shown, so that it can be freely rotated.

The front panel 4 is placed on the top of the frame. An AC cable 4a over which main power can be supplied, various switches, connectors, and an air supply/exhaust duct are exposed on the front panel 4.

The remote controller 5 has operation switches including a joystick 5a that is used to direct angling, and is connected to the front panel 4 over a cable 5a so that it can be disconnected freely. The monitor 6 is supported by a stretchable/contractile pole 6a so that it can be freely rotated. The container case 7 includes a cushion or the like against an impact on equipment to be stored therein.

The insertion unit guide member 10 comprises: a plurality of tubular members 8a, 8b, and 8c each of which has a guide channel that guides the insertion unit to near a target region to be observed and whose degrees of flexibility, diameters, and lengths are different from one another; and distal cover members 9a, 9b, and 9c which serve as direction changing means, which are attached to the distal ends of the tubular members 8a, 8b, and 8c respectively, and whose openings are used to change the inserting direction of the insertion unit.

According to the present embodiment, three tubular members are included. Moreover, the container case 7 comprises a housing 7a that forms the case body, and a lid 7b.

The insertion unit 2a of the endoscope 2 is extended from the front panel 4 via a rubber member 4b for use in preventing buckling of the insertion unit. The insertion unit 2a has a hard distal section 11, a bending section 12, and a flexible tube 13 concatenated in that order. The bending section 12 can be freely bent owing to a fluid pressure actuator. When the bending section 12 is bent, the distal section 11 is angled in a desired direction. The flexible tube 13 has flexibility.

A light source unit that is not shown, a CCU that is not shown, and a fluid pressure source 14 are stored in the bore of the drum 3. The light source unit supplies illumination light to a light guide (not shown) serving as an illumination light propagating means and lying through the endoscope 2. The CCU processes a signal sent from an imaging device (not shown) included in the distal section 11 of the endoscope insertion unit 2a. The fluid pressure source 14 supplies a fluid to the fluid pressure actuator that drives and bends the bending section of the endoscope insertion unit 2a.

The fluid pressure source 14 comprises a gas cylinder 15, a regulator 16 and a valve unit 17 included in a control unit, a control circuit board 18, and a tube 19 over which a fluid is supplied. The gas cylinder 15 is filled with a high-pressure gas. The regulator 16 and valve unit 17 control the pressure of the gas cylinder 15 in response to a bending direction signal sent from the remote controller 5, and thus bends the bending section 12. The control circuit board 18 controls the valve unit 17. The tube 19 is extended from the valve unit 17, and the fluid is supplied to the fluid pressure actuator over the tube 19. The gas cylinder 15 is filled with an uninflammable gas, for example, carbon dioxide, freon, nitrogen, helium, or argon. Reference numeral 20 denotes a cylinder connector to which the gas cylinder 15 is coupled so that it can be freely uncoupled.

The tubular members 8a, 8b, and 8c constituting the insertion unit guide member 10 are different from one another in the degree of flexibility, inner and outer diameters, and length. The distal cover members 9a, 9b, and 9c are fixed to the respective distal ends of the predetermined tubular members 8a, 8b, and 8c through, for example, bonding.

Figure 2A:
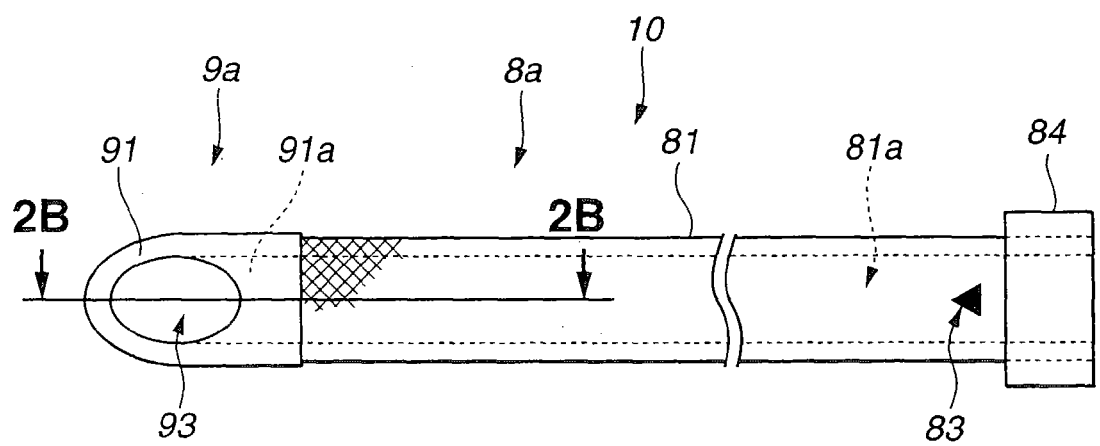
FIG. 2A is a front view of a direction changing port showing a distal cover member formed integrated with a tubular member included in an insertion unit guide member.
Figure 2B:
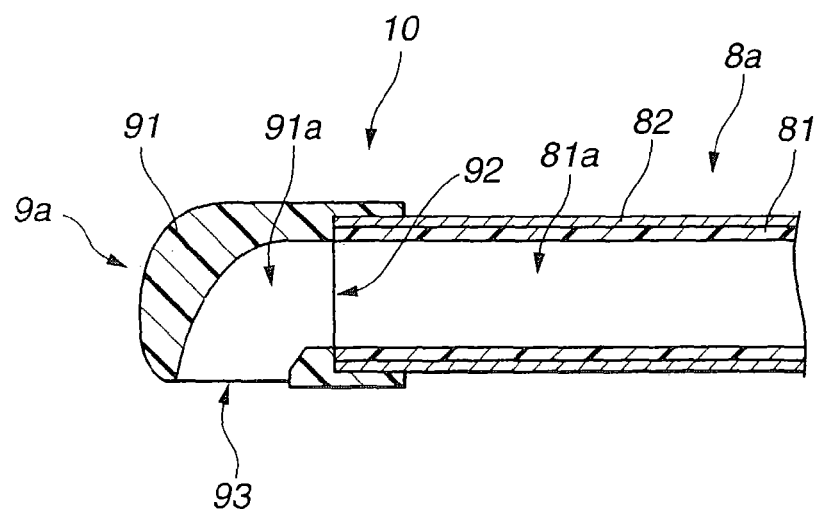
FIG. 2B is a 2B-2B sectional view of the distal cover member shown in FIG. 2A.

Referring to FIG. 2A and FIG. 2B, the tubular members and cover members will be described below. The tubular member 8a and distal cover member 9a will be described. The description of the tubular members 8b and 8c and the distal cover members 9b and 9c will be omitted because although they are different from the tubular member 8a and distal cover member 9a in the degree of flexibility, inner and outer diameters, and length, they have the same structures as the tubular member 8a and distal cover member 9a.

The tubular member 8a comprises a tube 81 and a braid 82. The tube 81 is made of a material having flexibility, for example, PTEE, and has a guide hole 81a that is a through hole serving as a guide channel. The braid 82 is formed by plaiting a wire or sheet made of, for example, a stainless steel, and sheathes the periphery of the tube 81. Incidentally, the flexibility of the tubular member is set to a predetermined degree by adjusting the thickness of the tube 81 or the strength of the braid 82.

In the present embodiment, the inner and outer diameters of the tubular members 8a, 8b, and 8c are determined to get smaller in that order. The lengths of the tubular members 8a, 8b, and 8c are determined to get larger in that order. The degrees of flexibility of the tubular members 8a, 8b, and 8c are determined to get higher in that order.

The inner diameter of the through hole of one tubular member and the outer diameter of other tubular member that is passed through the through hole are determined so that the latter tubular member or insertion member can be smoothly passed through the through hole of the former tubular member.

The distal cover member 9a has a passing direction changing hole 91a formed in a cover 91. The cover 91 is a resin member whose distal portion is shaped substantially like, for example, a hemisphere. The passing direction changing hole 91a is designed as a guide hole communicating with the guide hole 81a. A communication port 92 that is an opening of the passing direction changing hole 91a at one end thereof is formed in the proximal side of the cover 91 so that the passing direction changing hole 91a will communicate with the guide hole 81a. A direction changing port 93 that is an opening of the passing direction changing hole 91a at the other end thereof is formed in the lateral side of the cover 91.

Consequently, assume that the insertion unit 2a is inserted into the guide hole 81a of the tubular member having the distal cover fixed thereto which serves as a guide channel, and then thrust forward. At this time, the insertion unit 2a is guided into the passing direction changing hole 91a through the communication port 92 which is formed in the cover 91 and through which the passing direction changing hole 91a communicates with the guide hole 81a. The insertion unit 2a is then led out of the direction changing port 93.

Incidentally, reference numeral 84 denotes an annular proximal side base that is fixed to the periphery of the proximal end of the tube 81 and that also serves as a grip. The outer diameter of the proximal side base is larger than that of the tube 81. Moreover, reference numeral 83 denotes a mark notifying a user of the position of the direction changing port 93. Furthermore, although the bending section 12 is driven to bend using the fluid pressure actuator in the present embodiment, the bending section 12 may be driven to bend using a motor.

Figure 3:
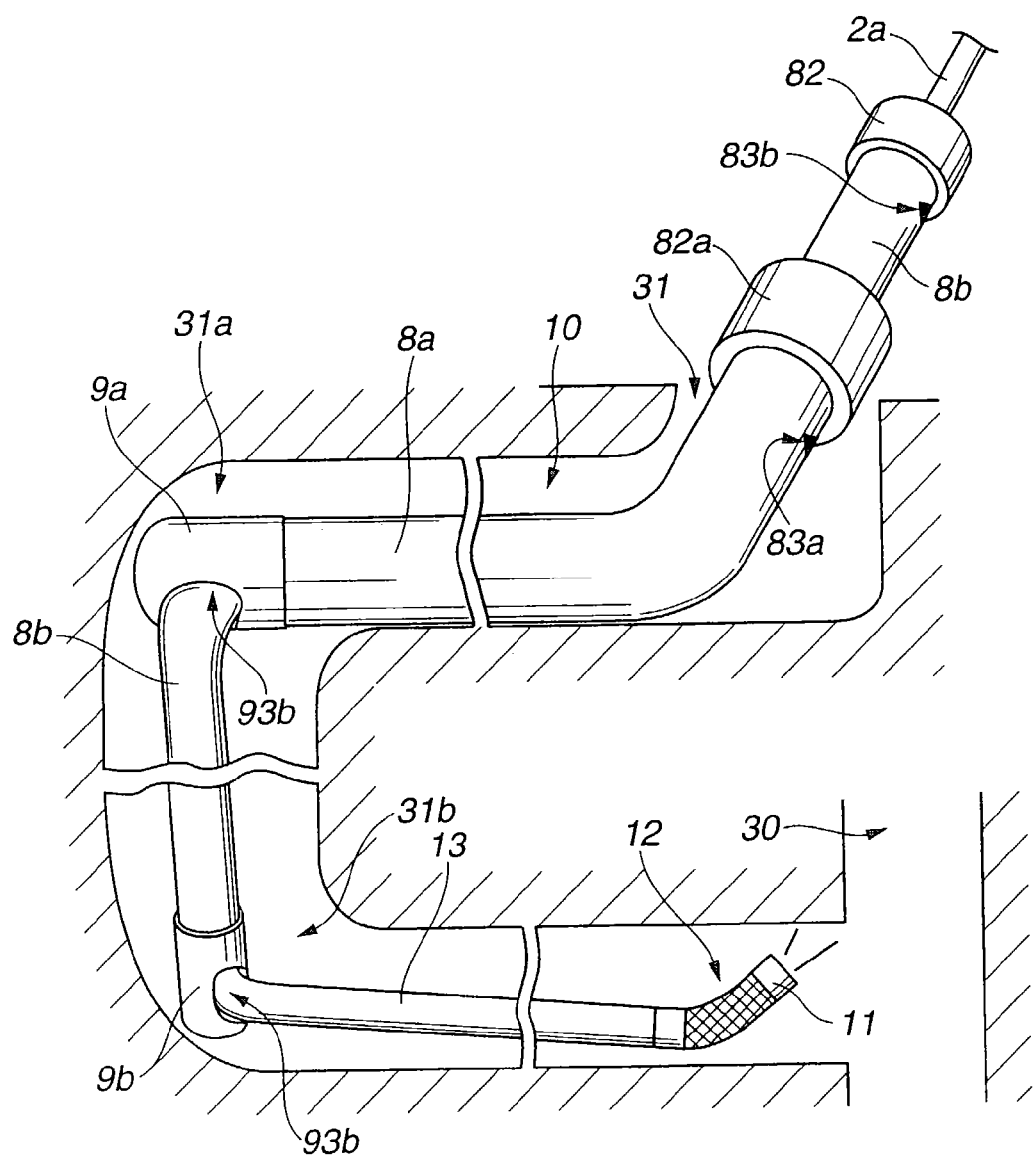

Referring to FIG. 3, the operation of the endoscope system 1 having the foregoing components will be described below.

As illustrated, the insertion unit 2a of the endoscope 2 is inserted into a pipe 31, which has a large diameter and includes two elbows 31a and 31b that are bent at right angles, in order to observe a main pipe 30 that is a target region to be observed.

For observation, first, the tubular members 8a and 8b are prepared. The tubular member 8a is rather hard and has the distal cover member 9a fixed to the distal end thereof. The tubular member 8a has a length permitting the distal cover member 9a thereof to reach the first elbow 31a. The tubular member 8b is relatively soft and has the distal cover member 9b fixed to the distal end thereof. The tubular member 8b has a length permitting the distal cover member 9b thereof to reach the second elbow 31b.

Thereafter, the tubular member 8a having the distal cover member 9a fixed thereto is inserted into the pipe 31. Since the tubular member 8a exhibits a rather low degree of flexibility and is therefore rather hard, the tubular member 8a advances smoothly towards the first elbow 31a. When it is confirmed that the distal cover member 9a has reached near the first elbow 31a because, for example, the distal end of the distal cover member 9a hits the pipe, the proximal side base 84a is held in order to twist the tubular member 8a. The position of the mark 83a is adjusted so that the mark will align with a predetermined direction. Consequently, the direction of the direction changing port 93a agrees with the deep direction of the pipe 31.

Thereafter, the tubular member 8b having the distal cover member 9b fixed thereto is passed through the guide hole 81a of the tubular member 8a. The tubular member 8a passes through the guide hole 81a, communication port 92a, and passing direction changing hole 91a, and then juts out of the direction changing port 93a. Consequently, the tubular member 8a is led out to the pipe 31 near the first elbow 31a. Since the tubular member 8b exhibits a low degree of flexibility and is rather soft, after the tubular member 8b juts out of the direction changing port 93a, the tubular member 8b smoothly advances towards the second elbow 31b.

When it is confirmed that the distal cover member 9b has reached near the second elbow 31b because, for example, the distal end of the distal cover member 9b hits the pipe, the proximal side base 84b is held in order to twist the tubular member 8b. The position of the mark 83b is thus adjusted so that the mark will align with a predetermined direction. Consequently, the direction of the direction changing port 93b is agreed with the deep direction of the pipe 31.

Thereafter, the insertion unit 2a of the endoscope 2 is passed through the guide hole 81a of the tubular member 8b. The insertion unit 2a passes through the guide hole 81a, communication port 92b, and passing direction changing hole 91a, and then juts out of the direction changing port 93b. Consequently, the insertion unit 2a is led out to the pipe 31 near the second elbow 31b. After the insertion unit 2a juts out of the direction changing port 93b, the insertion unit 2a is thrust forward. The insertion unit 2a is then angled, twisted, or anyhow handled adroitly, whereby the interior of the pipe 31 is observed.

As mentioned above, the endoscope system includes the insertion guide member that comprises a plurality of tubular members and a plurality of distal cover members attached to the respective tubular members. The insertion unit guide member is inserted into a pipe or the like in advance and placed near a target region to be observed. The insertion unit of the endoscope is passed through the guide channels formed in the insertion unit guide member. Consequently, the insertion unit is smoothly led to near the target region to be observed. This results in successful endoscopic observation.

Figure 4A:
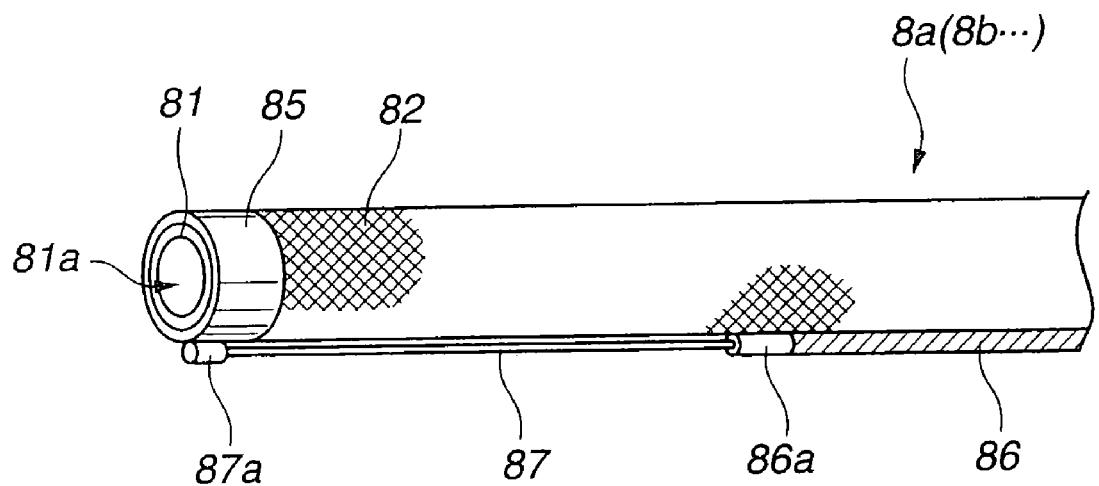
FIG. 4A is an explanatory diagram showing other example of the structure of a direction changing means.

Now, referring to FIG. 4A and FIG. 4B, an example of other structure of the direction changing means will be described below.

According to the foregoing embodiment, the direction changing means is the distal cover member that is fixed to the distal end of the tube 81 and that has the direction changing port 93, which is a lateral opening, formed therein. However, the direction changing means is not limited to the distal cover member. Namely, as shown in FIG. 4A, the direction changing means may comprise an annular distal base member 85 and an operation wire 87. The distal base member 85 is located at the distal end of the tube 81 that has the guide hole 81a and that is included in the tubular member 8a. The operation wire 87 is made of, for example, a stainless steel. The distal end of the operation wire 87 is fixed to the distal base member 85. The proximal portion of the operation wire 87 is passed through, for example, a coil sheath 86 and extended in a proximal direction towards a hand-held portion.

Reference numeral 87a denotes a locking member fixed to the distal end of the operation wire 87. The locking member 87a is attached to the distal base member 85 at a predetermined position on the periphery of the distal base member 85. Reference numeral 86a denotes a locking member fixed to the distal end of the coil sheath 86. The locking member 86a is attached to the braid 82 sheathing the tube 81 at a predetermined position.

Figure 4B:
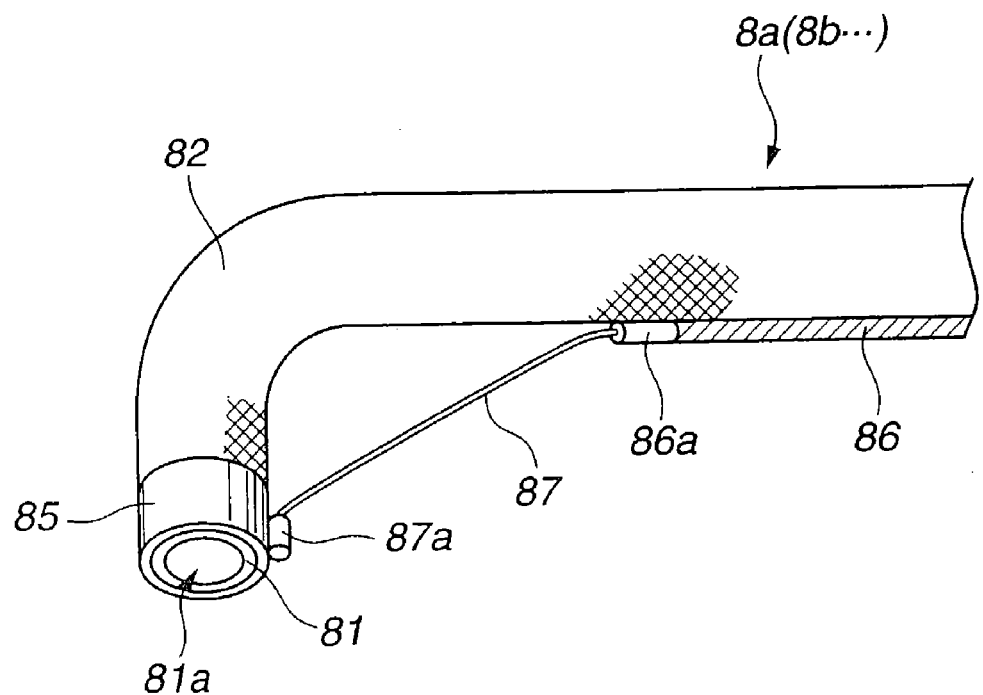
FIG. 4B is an explanatory diagram showing the operation of the direction changing means.

Consequently, as shown in FIG. 4B, when a user pulls the operation wire 87 appropriately, the distal portion of the tube 81 is bent to a desired extent. Consequently, the same operation and advantages as those mentioned above can be provided.

Figure 5A:
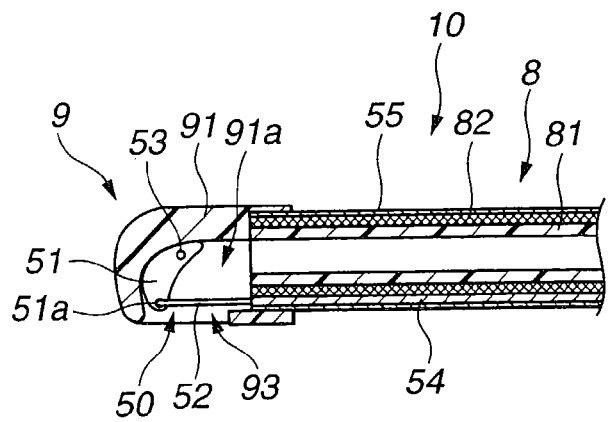
FIG. 5A is an explanatory diagram showing a distal cover member having a raiser, that is, another example of the structure of the direction changing means.

As shown in FIG. 5A, a leading direction adjusting means 50 may be provided in the passing direction changing hole 91a formed in the distal cover member 9 attached to the distal end of the tubular member 8 included in the insertion unit guide member 10. The leading direction adjusting means 50 adjusts the leading direction in which the tubular member 8 or insertion unit 2a is led out of the passing direction changing hole 91a.

The leading direction adjusting means 50 comprises a raiser 51 and an operation wire 52. The raiser 51 is located at the distal end of the passing direction changing hole 91a. The raiser 51 is pivoted at a predetermined position in the passing direction changing hole 91a so that it can pivot on a rotation shaft 53.

On the other hand, the operation wire 52 has the distal end thereof fixed to a wire fixer 51a located on the raiser 51, and has the proximal end thereof extended to a hand-held portion. The wire 52 is passed through a coil sheath 54 placed on the periphery of the braid 82 included in the tubular member 8. The coil sheath 54 is integrated with the periphery of the tubular member 8 owing to a braid 55.

Incidentally, the coil sheath 54 may be interposed between the tube 81 and braid 82 constituting the tubular member 8.

Figure 5B:
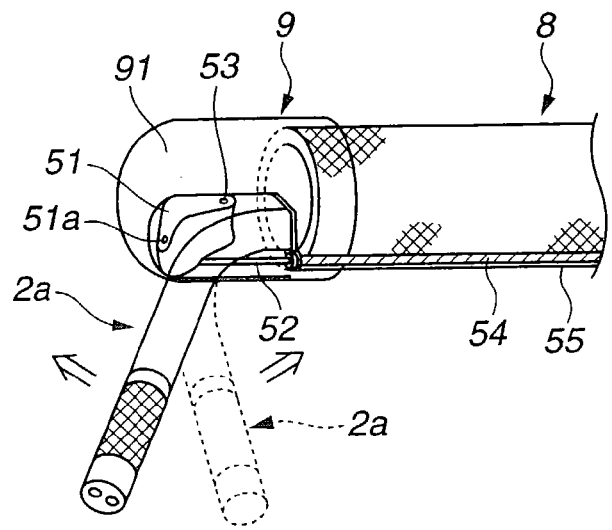
FIG. 5B is an explanatory diagram showing the operation of the raiser.

Consequently, as shown in FIG. 5B, when a user pulls the operation wire 52 appropriately, the raiser 51 locked in the passing direction changing hole 91a of the distal cover member 9 is raised to a predetermined extent. Consequently, the insertion unit 2a jutting out of the direction changing port 93 moves to a state indicated with a solid line or to a state indicated with a dashed line according to the extent to which the raiser 51 is raised.

Figure 5C:
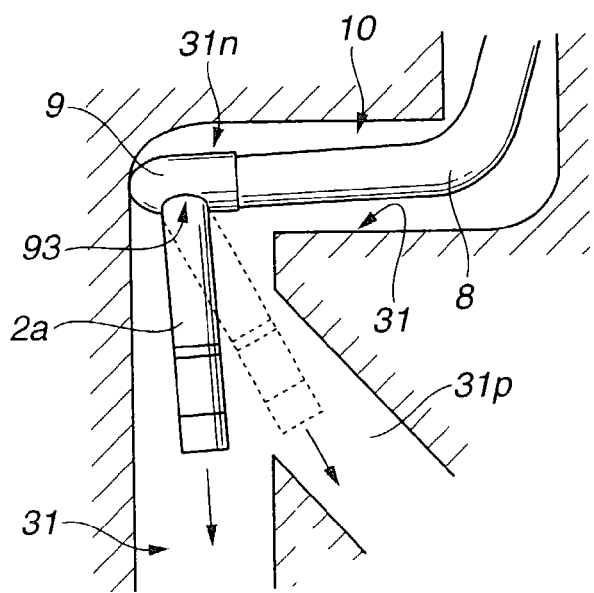
FIG. 5C is an explanatory diagram showing the operation of an insertion unit guide member including a tubular member that has the distal cover.

Consequently, in order to inspect the interior of a pipe bifurcated into a main pipe 31a and a branch pipe 31p that extend in a deep direction beyond an elbow 31n, the insertion unit guide member 10 is structured so that the tubular member 8 having the distal cover member 9, which includes the raiser 51 and operation wire 52, fixed thereto can be positioned near the elbow 31n. Consequently, as shown in FIG. 5C, the raiser 51 can be raised appropriately in order to guide the insertion unit 2a into the main pipe 31 or the branch pipe 31p. Thus, inspection can be achieved reliably.

Figure 6A:
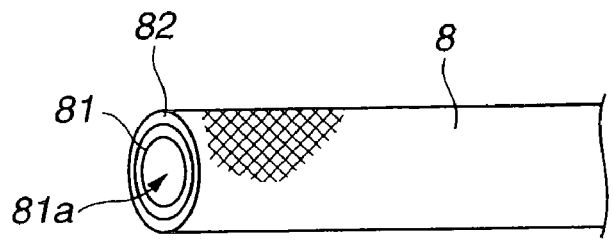
FIG. 6A shows a tubular member having other structure that permits an insertion unit to thrust forward.

In the foregoing embodiment, the distal cover member is attached to the distal end of the tubular member, and the insertion unit guided along the guide hole is jutted out in a lateral direction. However, as shown in FIG. 6A, the insertion unit 2a guided along the guide hole 81a of the tubular member 8 may be jutted forward but not laterally. In other words, a tubular member having no direction changing means may be employed.

Figure 6B:
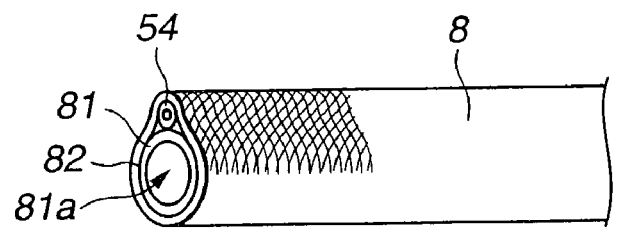
FIG. 6B is an explanatory diagram showing the tubular member that is shown in FIG. 6A and that has a coil sheath.
Figure 6C:
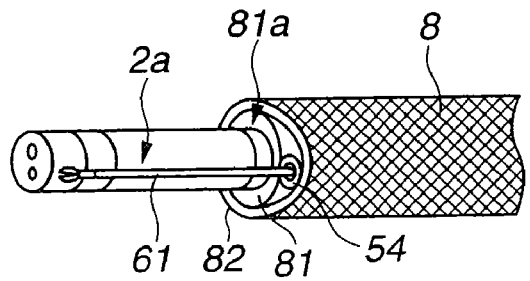
FIG. 6C is an explanatory diagram concerning an example of the operation of the coil sheath.

In this case, as shown in FIG. 6B, for example, the coil sheath 54 may be interposed between the tube 81 and braid 82 constituting the tubular member 8 or a tool pipe member such as a super-elastic pipe may be interposed between them. Consequently, as shown in FIG. 6C, the insertion unit 2a of the endoscope 2 is inserted into the guide hole 81a, and a grinder, a gripper, or any other tool 61 can be passed through the coil sheath 54. Consequently, repair work or the like can be performed concurrently with endoscopic observation.

Figure 6D:
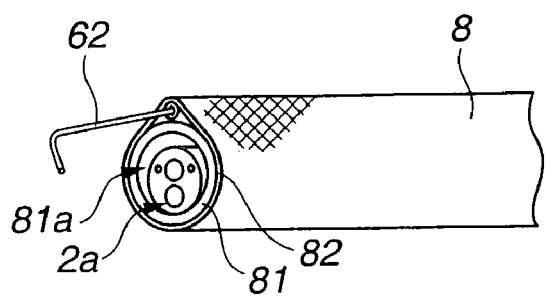
FIG. 6D is an explanatory diagram concerning another example of the operation of the coil sheath.

Moreover, as shown in FIG. 6D, a hook member 62 that holds the distal portion of the tubular member 8 in a stable manner may be passed through the coil sheath 54. This contributes to improvement of workability.

Figure 6E:
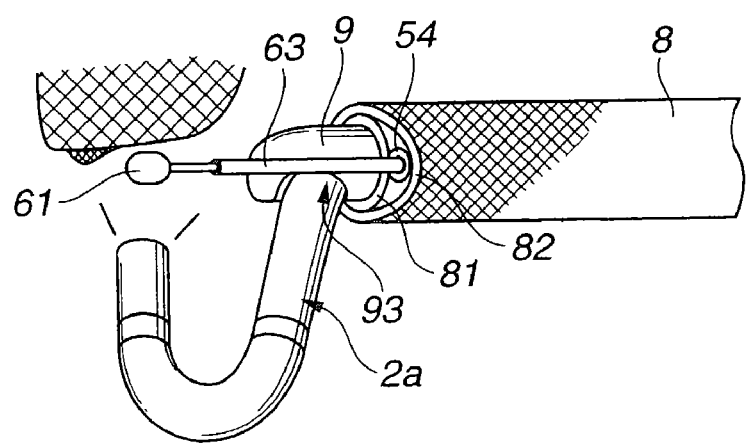
FIG. 6E is an explanatory diagram concerning the structure and operation of a tubular member that has a distal cover member and that includes a coil sheath as an integral part thereof.

Moreover, as shown in FIG. 6E, when the distal cover member 9 is attached to the distal end of the tubular member 8, the coil sheath 54 may be interposed between the tube 81 and braid 82 as an integral part of the tubular member. In this case, for example, the tool 61 such as a grinder can be used to perform repair work.

Figure 7:
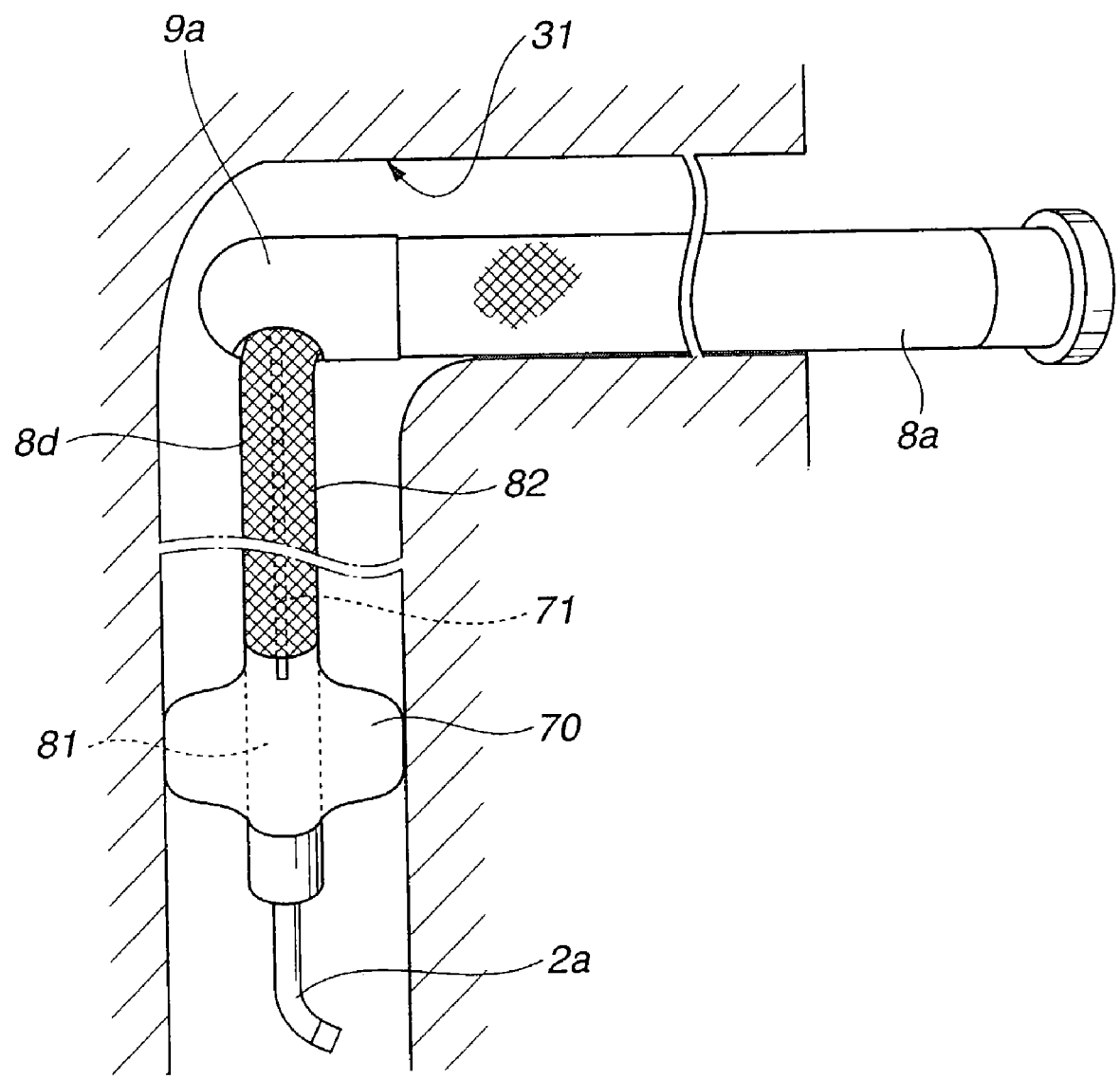

As shown in FIG. 7, a balloon 70 may be attached to the middle of a tubular member 8d, and an air/fluid supply tube 71 that communicates with the balloon 70 may be interposed between the tube 81 and braid 82. In this case, when the balloon 70 is dilated by way of the air/fluid supply tube 71, the middle of the tubular member 8d can be locked in the pipe 31 on a stable basis.

By sustaining this state, the insertion unit 2a of the endoscope 2 can be smoothly inserted into the guide hole, which is not shown, of the tubular member 8d. Moreover, the middle of the pipe can be inspected reliably.

Figure 8A:
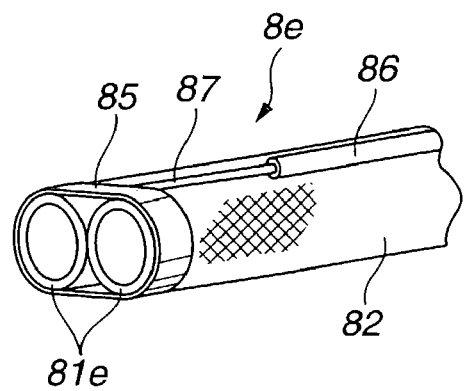
FIG. 8A shows an insertion unit guide member having two tubes sheathed with a braid and having a flat shape.
Figure 8B:
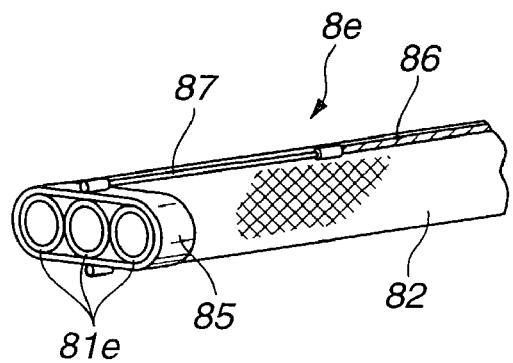
FIG. 8B shows an insertion unit guide member having three tubes sheathed with a braid and having a flat shape.

Some pipes that are objects of inspection may have a flat sectional shape (may be shaped like a flat circle, ellipse, rectangle, etc.). Some pipes change the bending direction thereof, in which they bend, regularly (for example, stepwise). In this case, the tubular member need not be structured to have a circular section. In other words, a flat tubular member 8e like the one shown in FIG. 8A or FIG. 8B may be adopted so that it will match the pipe having a flat sectional shape.

In order to form the flat tubular member 8e, a plurality of tubes 81e each having a guide hole 81a through which the insertion unit 2a is smoothly passed is juxtaposed and sheathed with the braid 82. Thus, the flat shape is attained. Moreover, the direction changing means comprises the distal base member 85 and the operation wire 87 made of, for example, a stainless steel. The distal end of the operation wire 87 is fixed to the distal base member 85, and the proximal end thereof is passed through, for example, the coil sheath 86 and extended in a proximal direction towards a hand-held portion.

Figure 8C:
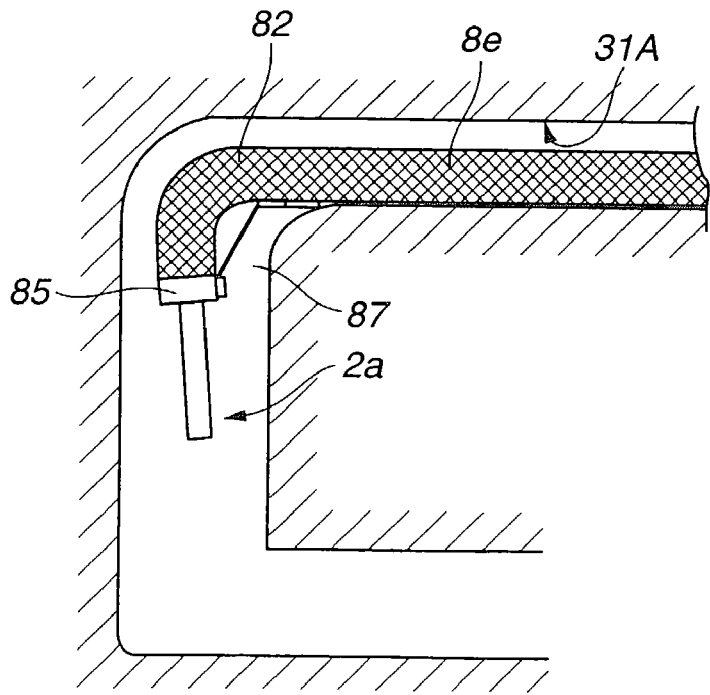
FIG. 8C is an explanatory diagram concerning the operation of the insertion unit guide member having a flat shape.

Consequently, as shown in FIG. 8C, the insertion unit guide member 10 having the plurality of tubes 81e integrated thereinto using the braid 82 is smoothly passed through a pipe 31A, which bends regularly and has a flat sectional shape, up to a target region without a displacement in the width direction within the flat interior of the pipe 31A. When the distal end of the insertion unit guide member 10 reaches the target region, the insertion unit 2a is inserted into the guide hole 81a of the tube 81e that is selected from among the plurality of tubes 81e because it opens at a desired position. Consequently, the insertion unit 2a is jutted into the pipe 31A for the purpose of endoscopic observation.

Figure 9A:
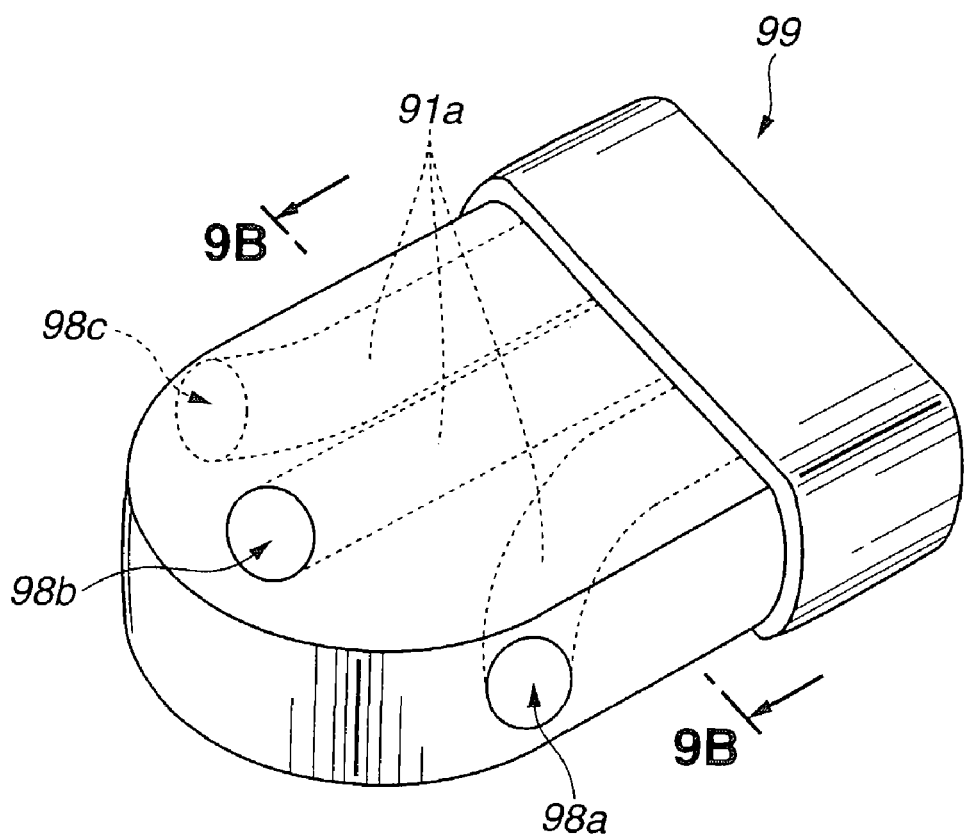
FIG. 9A is a perspective view showing a distal cover member to be attached to the insertion unit guide member having a flat shape.
Figure 9B:
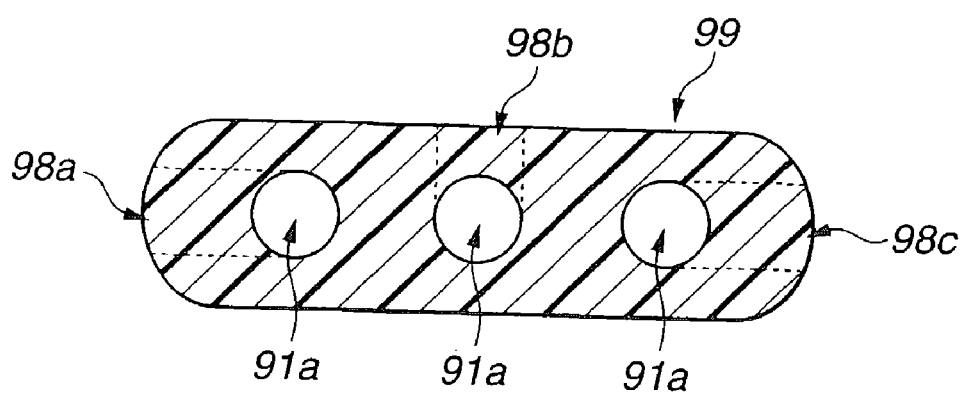

Incidentally, when the flat-shape insertion unit guide member 10 is formed, the direction changing means may not comprise the distal base member 85 and operation wire 87 as mentioned above. Instead, a distal cover member 99 structured as shown in, for example, FIG. 9A and FIG. 9B may be attached to the distal end of the tubular member 8e that has the plurality of tubes 81e sheathed with the braid 82 and that is thus shaped flat.

The distal cover member 99 has a plurality of passing direction changing holes 91a. One openings of the passing direction changing holes 91a communicate with the respective tubes 81e, and the other openings are formed as direction changing ports 98a, 98b, and 98c at different positions on the lateral side of the distal cover member 99.

Consequently, after the insertion unit guide member 10 is led to, for example, a bifurcation that is not shown, the insertion unit 2a is passed through the tube 81e whose opening is located at a desired position. Eventually, the insertion unit 2a can be guided to a desired branch pipe in order to inspect the interior of the pipe.

Second Embodiment

Figure 10:
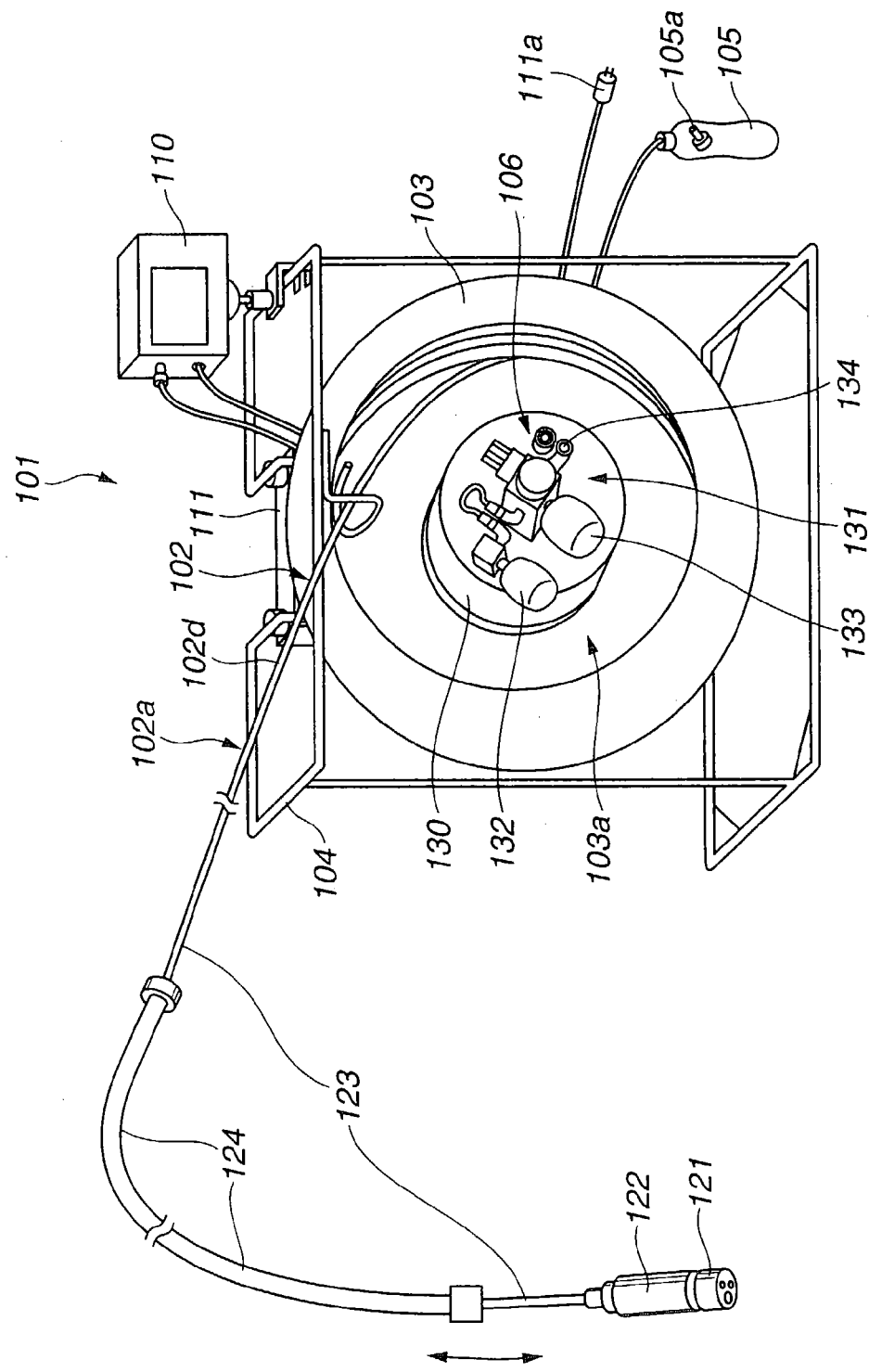

As shown in FIG. 10, an endoscope system 101 in accordance with the present embodiment comprises an endoscope 102, a drum 103, a frame 104, and a remote controller 105. Reference numeral 106 denotes a controller. The endoscope 102 has an elongated insertion unit 102a. The insertion unit 102a is wound about the internal surface of the drum 103. The frame 104 is a support that holds the drum 103 so that the drum 103 can rotate freely. The remote controller 105 has operation switches including a joystick 105a that is used to direct the endoscope 102 to angle the insertion unit.

The endoscope system 101 includes a monitor 110 on which an endoscopic image picked up by the endoscope 102 is displayed, an AC adapter 111 serving as a power supply, and a personal computer (112 in FIG. 15 to be described later). The personal computer 112 is connected to the endoscope system via a PC connector that is not shown, and used to modify control data or the like to be transmitted to a valve control unit that will be described later. Reference numeral 111a denotes a receptacle to be mated with a mains outlet.

On the other hand, a substantially cylindrical united body 130 having an opening formed at one end thereof and forming the controller 106 is located in the center of the interior of the drum 103. A fluid pressure source 131 for supplying a fluid to a fluid pressure actuator that will be described later is located near a drum opening 103a formed in the external surface of the bottom of the united body 130.

The fluid pressure source 131 comprises a gas cylinder 132 filled with a high-pressure gas, a regulator 133 that controls the pressure of the gas cylinder 132, and a duct 134 over which a fluid is supplied at a predetermined pressure. The gas cylinder 132 is filled with, for example, carbon dioxide, freon, nitrogen, helium, argon, or any other uninflammable gas.

Figure 11:
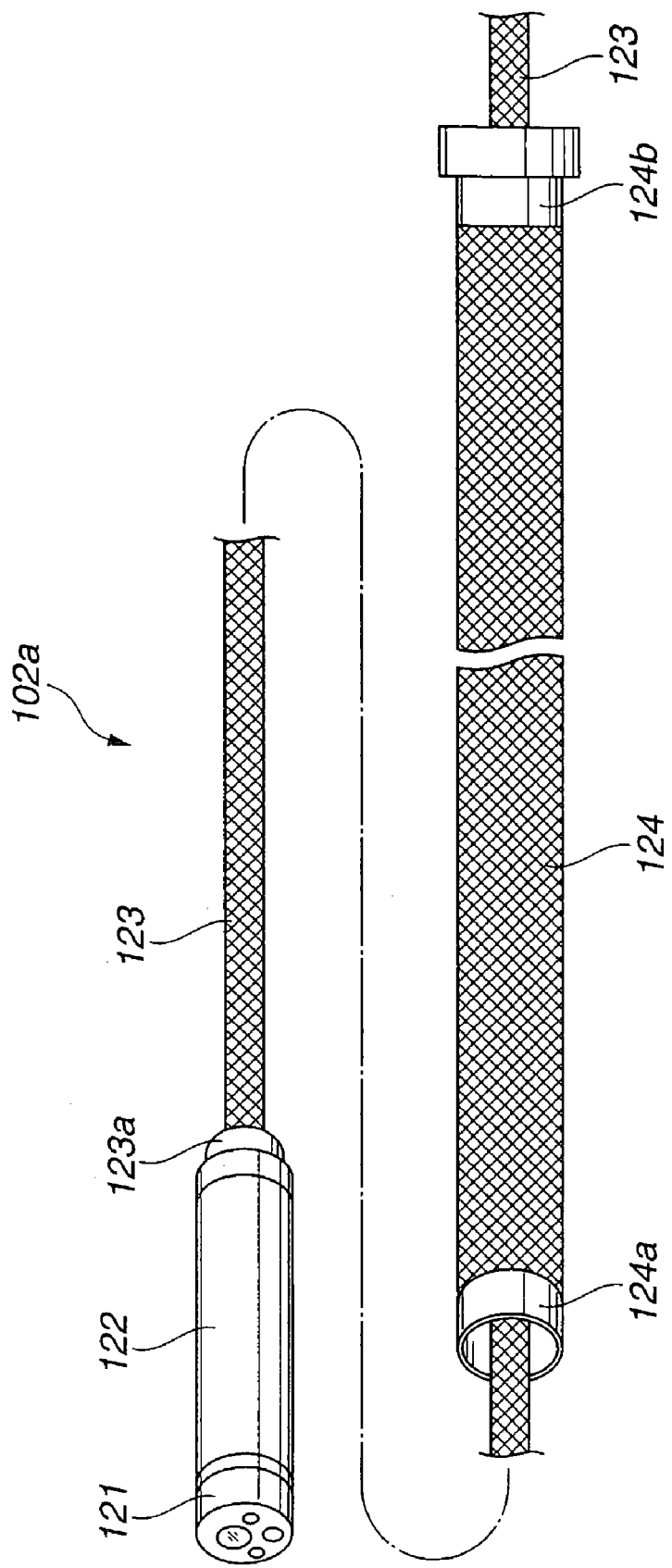

As shown in FIG. 10 and FIG. 11, the insertion unit 102a has a distal section 121, a bending section 122, a flexible tube 123, and a guide tube 124.

The distal section 121 includes an observational optical system and an illumination optical system which are not shown. The bending section 122 adjoins the distal section 121, and acts as a fluid pressure actuator that will be described later.

The flexible tube 123 adjoins the bending section 122, and has a metallic braid and a tube body, which will be described later, integrated thereinto. The outer diameter of the flexible tube 123 is smaller than the outer diameter of the bending section 122.

The guide tube 124 has, similarly to the flexible tube 123, a metallic braid and a tube body integrated thereinto. The outer diameter of the guide tube 124 is substantially identical to the outer diameter of the bending section 122.

The guide tube 124 is brought to a state in which it is integrated with the flexible tube 123 or a state, in which it can freely slide on the flexible tube, by means of an attaching/detaching means that will be described later. Reference numeral 123a denotes a distal flexible tube base used to join the bending section 122 and flexible tube 123. Reference numeral 124a denotes a distal guide tube base having the attaching/detaching means. Reference numeral 124b denotes a proximal guide tube base that also serves as a grip.

Figure 12A:
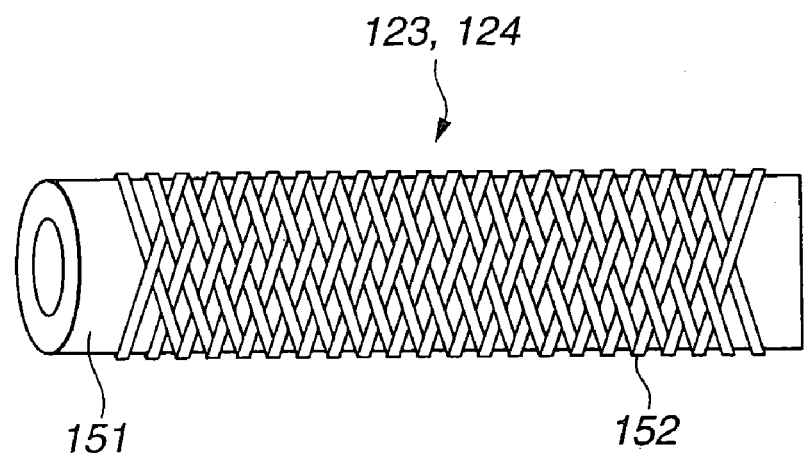
FIG. 12A is a perspective view showing the structure of a flexible tube and a guide tube.

As shown in FIG. 12A, the guide tube 124 and flexible tube 123 each have the periphery of an elongated tube body 151 sheathed with a metallic braid 152, and each exhibit predetermined degrees of softness and flexibility. The tube body 151 is made of, for example, Teflon®. The metallic braid 152 is formed by plaiting a wire or sheet made of, for example, a stainless steel. The bases 123a, 124a, and 124b are mounted on the distal and proximal ends of the tube bodies 151.

Figure 12B:
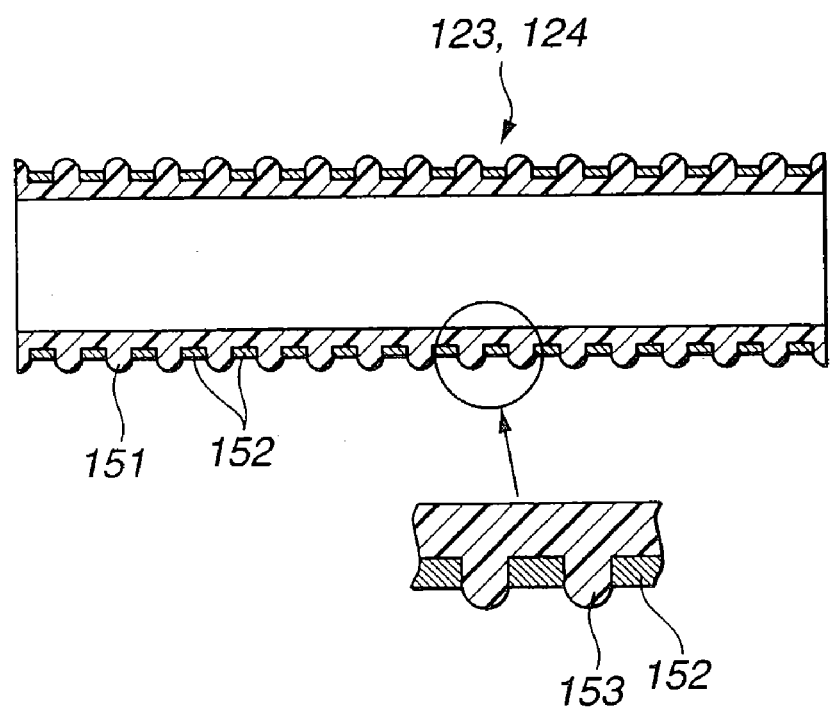
FIG. 12B is a sectional view containing an enlarged view of part of the flexible tube and guide tube.

As shown in FIG. 12B, a plurality of bosses 153 whose distal portions are shaped substantially like a hemisphere is formed on the external surface of the tube body 151. The distal portions of the bosses 153 are jutted out of the metallic braid 152. Consequently, the distal portions of the bosses 153 formed on the flexible tube 123 come into contact with the internal surface of the tube body 151 included in the guide tube 124 at points. On the other hand, the distal portions of the bosses 153 formed on the guide tube 124 come into contact with the internal surface of a pipe, into which the insertion unit is inserted, at points.

Incidentally, the tube bodies of the guide tube 124 and flexible tube 123 respectively are different from each other in the diameter and length. Moreover, the tube bodies 151 and metallic braids 152 of the guide tube 124 and flexible tube 123 respectively are set to predetermined dimensions.

Figure 13:
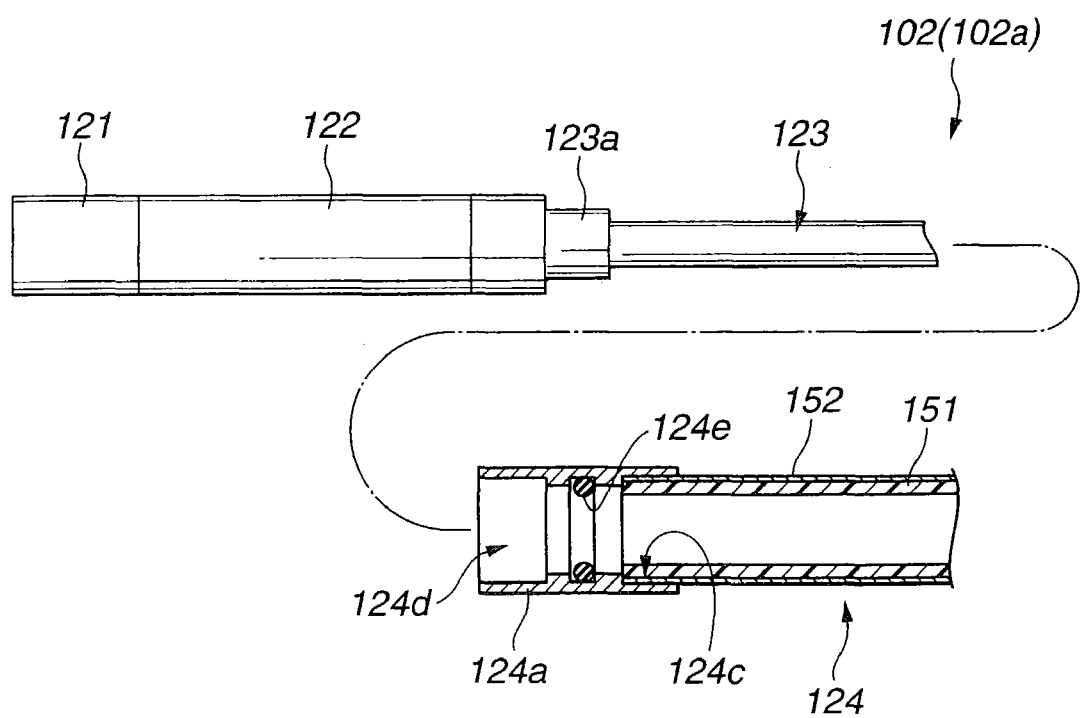

As shown in FIG. 13, the distal guide tube base 124a has a tube body placement recess 124c and a stepped recess 124d. The tube body placement recess 124c is mounted on the periphery of the distal portion of the tube body 151 included in the guide tube 124. The stepped recess 124d is mounted on the periphery of the bending section 122 and the periphery of the distal flexible tube base 123a.

An O ring 124e formed with an elastic member that is an attaching/detaching means is located at a predetermined position in the stepped recess 124d. The O ring 124e is brought into close contact with the periphery of the distal flexible tube base 123a with predetermined holding force.

Figure 14:
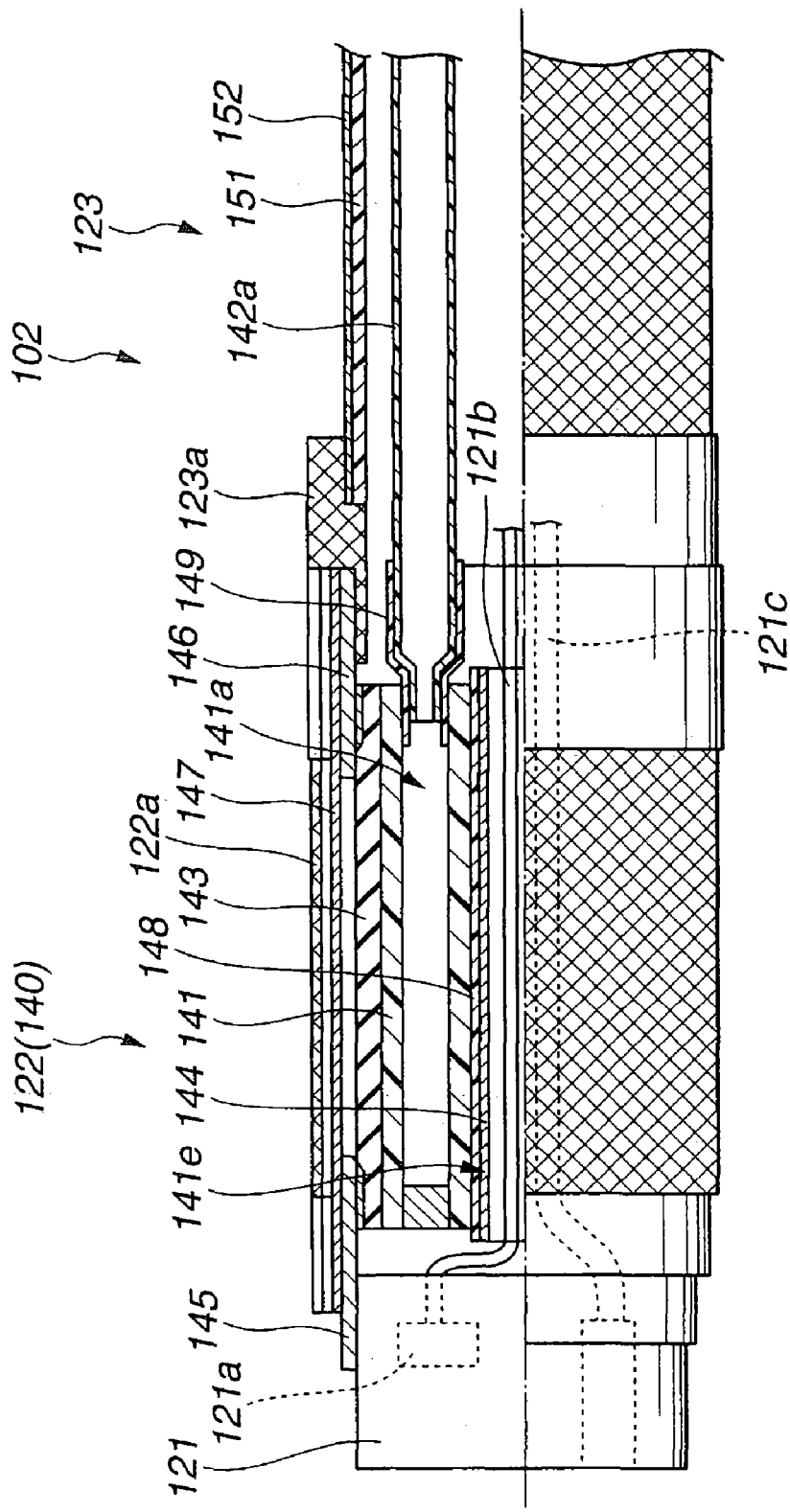
FIG. 14 is an explanatory diagram concerning the structure of a bending section.
Figure 15:
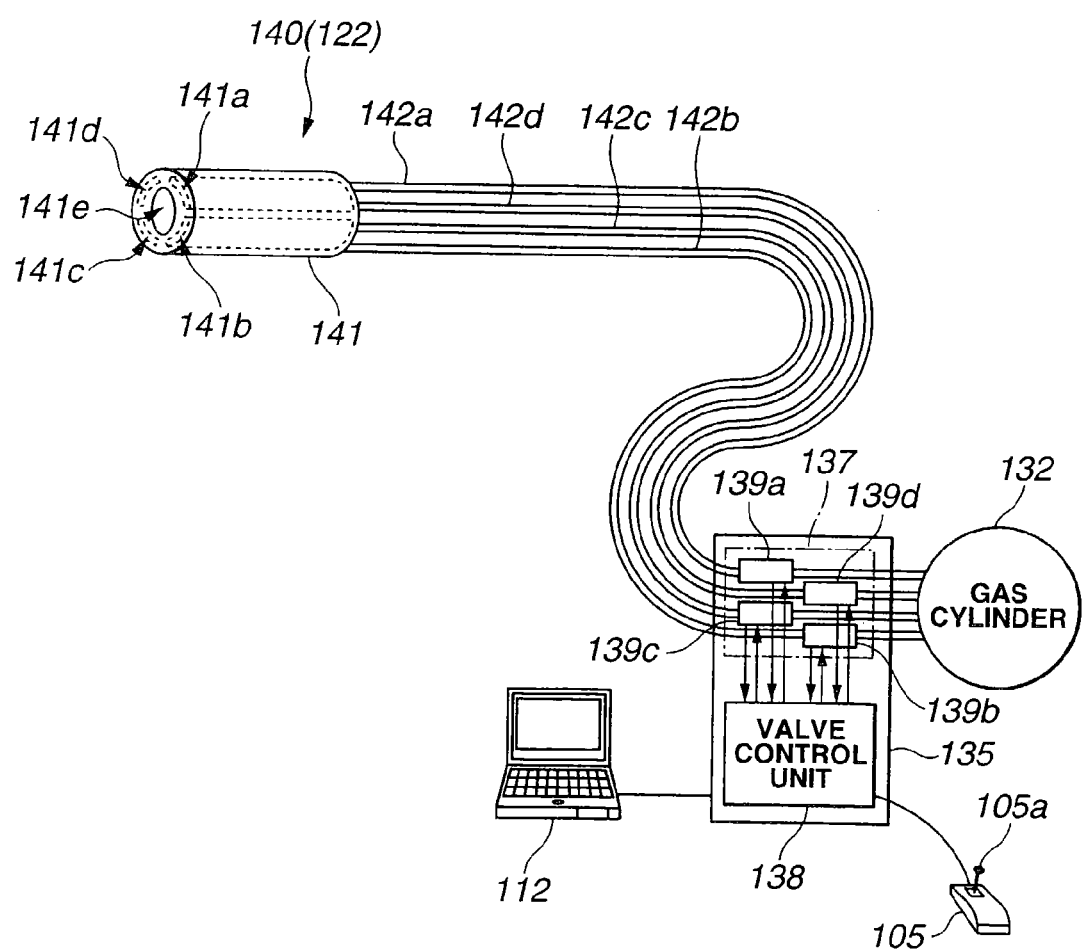
FIG. 15 is an explanatory diagram concerning the relationship between fluid compartments and a valve unit.
Figure 19A:
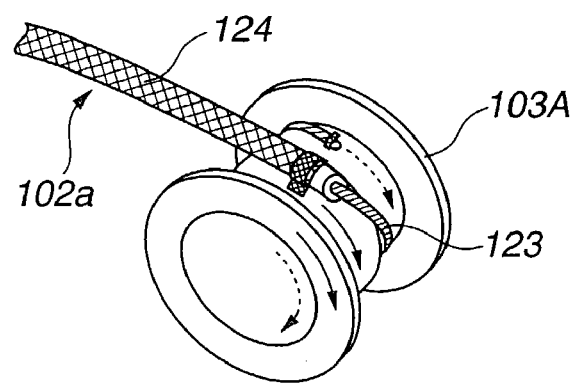
FIG. 19A is a perspective view showing the relationship between the insertion unit and a drum.
Figure 19B:
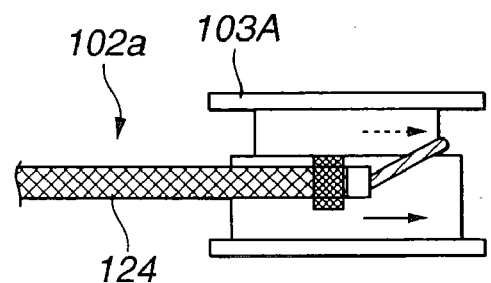
FIG. 19B is a plan view showing the relationship between the insertion unit and the drum.
Figure 20A:
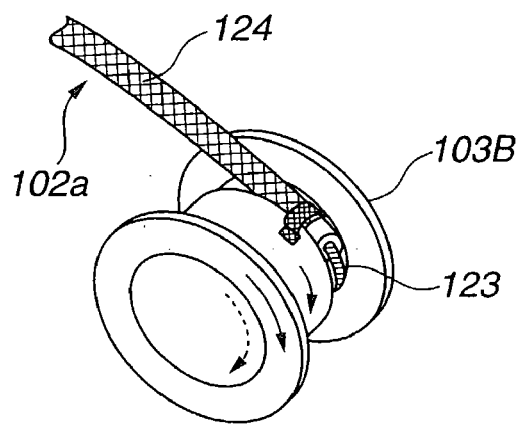
FIG. 20A is a perspective view showing the another relationship between the insertion unit and the drum.
Figure 20B:
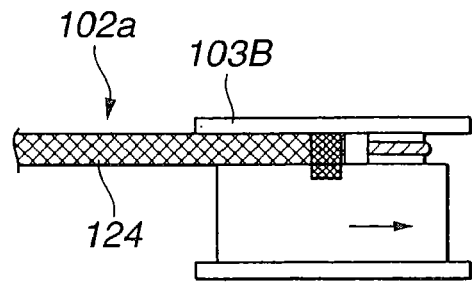
FIG. 20B is a plan view showing the another relationship between the insertion unit and the drum.

Referring to FIG. 14 and FIG. 15, the structure of the bending section 122 will be described below.

As illustrated, the bending section 122 adjoining the distal section 121 is formed as a fluid pressure actuator 140. The fluid pressure actuator 140 comprises a multi-lumen tube 141 and insertion unit-side fluid supply tubes (hereinafter, insertion unit-side tubes) 142a, 142b, 142c, and 142d.

The multi-lumen tube 141 has four fluid compartments 141a, 141b, 141c, and 141d which extend in the bendable directions of the bending section 122, for example, upward, downward, rightward, and leftward directions, and a central through hole 141e. The insertion unit-side tubes 142a, 142b, 142c, and 142d communicate with the fluid compartments 141a, 141b, 11c, and 141d respectively. The insertion unit-side tubes 142a, 142b, 142c, and 142d are made of, for example, Teflon®, nylon®, THV, polyimide, Hytrel, Aflon, PEEK, or PBT.

A supply-of-fluid control unit 135 that controls a supply of fluid from the gas cylinder 132 is placed in the bore of the united body 130. The supply-of-fluid control unit 135 comprises a valve unit 137 and a valve control unit 138 that controls the valve unit 137. The valve unit 137 includes four electromagnetic valve assemblies 139a, 139b, 139c, and 139d associated with the fluid compartments 141a, 141b, 141c, and 141d respectively.

By appropriately handling the joystick 105a on the remote controller 105, the fluid in the gas cylinder 132 is fed into the fluid compartments 141a, 141b, 141c, and 141d by way of the insertion unit-side tubes 142a, 142b, 142c, and 142d. The fluid is fed into a desired one of the fluid compartments 141a, 141b, 141c, and 141d, whereby the bending section 122 is bent in a desired direction.

Incidentally, a signal line 121b, a light guide fiber 121c, and other built-in components lie through the central through hole 141e. The signal line 121b is extended from, for example, a CCD 121a included in the observational optical system. The light guide fiber 121c is included in the illumination optical system.

Moreover, an inner coil 144 lies through the central through hole 141e. The inner coil 144 prevents the fluid compartments 141a, 141b, 141c, and 141d from dilating towards the center axis of the multi-lumen tube 141 and thus making the diameter of the central through hole 141e smaller. Moreover, the inner coil 144 helps the multi-lumen tube 141 efficiently stretch in the longitudinal direction. This contributes to improvement of bending efficiency.

Furthermore, an outer coil 147 is mounted on the periphery of the multi-lumen tube 141. The outer coil 147 prevents the fluid compartments 141*a*, 141*b*, 141*c*, and 141*d* from dilating towards the periphery of the multi-lumen tube 141. Moreover, the outer coil 147 helps the multi-lumen tube 141 efficiently stretch in the longitudinal direction. This contributes to improvement of bending efficiency. In addition, owing to the inclusion of the inner coil 144 and outer coil 147, the multi-lumen tube 141 will not be dilated excessively. This leads to improvement of durability.

Moreover, the periphery of the inner coil 144 is sheathed with, for example, a silicon tube 148. The silicon tube 148 prevents the multi-lumen tube 141 from being entrapped in a space between adjoining portions of the inner coil 144 during bending of the bending section 122. The periphery of the outer coil 147 is sheathed with, for example, an armor tube 143. The armor tube 143 prevents the multi-lumen tube 141 from being entrapped in a space between adjoining portions of the outer coil 147 during bending the bending section 122.

Reference numeral 122*a* denotes a braid outlining the bending section 122. Reference numeral 145 denotes a distal bending section base serving as the joint of the bending section and distal section 121. Reference number 146 denotes a proximal bending section base that is joined to the distal flexible tube base 123*a* of the flexible tube 123. Reference numeral 149 denotes communication members which are formed with, for example, silicon tubes and via which the fluid compartments and the insertion unit-side tubes communicate with one another. The bases 145 and 146 are fixed to the distal and proximal ends of the armor tube 143 through, for example, bonding.

The operation of the endoscope system 101 having the foregoing components will be described below.

A description will be made of a case where the endoscope system 101 is used to inspect, for example, gas pipes including domestic gas pipes laid down in a household and a main gas pipe.

First, an inspector plugs in the receptacle 111*a*, and slowly pulls out the insertion unit 102*a* from the drum 103.

Thereafter, the remote controller 105 is held and the power switch is handled in order to bring the endoscope system into a state in which the insertion unit can be angled.

Thereafter, the inspector holds the guide tube 124 included in the insertion unit 102*a* and the proximal guide tube base 124*b*. The inspector then, as shown in FIG. 16, inserts the insertion unit 102*a* of the endoscope 102 into an opening and advances it to a main pipe.

At this time, the joystick 105*a* located on the remote controller 105 is handled if necessary in order to change the bent state of the bending section 122. Otherwise, the guide tube 124 is twisted with the hand that holds the guide tube 124. Thus, the distal section 121 of the insertion unit 102*a* is passed the elbows of a gas pipe, and thrust forward in a deep direction. When the distal section 121 has passed a plurality of elbows as indicated with a solid line, it becomes hard to further advance the insertion unit 102*a*.

In the case of the endoscope 102 included in the present embodiment, the flexible tube 123 located near behind the proximal base 124*c* is held and thrust towards the distal section. This causes the distal flexible tube base 123*a* of the flexible tube 123 to move to the distal section against the holding force exerted by the O ring 124*e* included in the distal guide tube base 124*a* of the guide tube 124. With the movement, the flexible tube 123 is thrust out of the distal guide tube base 124*a* as indicated with a dashed line.

Thereafter, the joystick 105*a* is handled if necessary in order to change the bent state of the bending section 122. Otherwise, the flexible tube 123 is twisted with the hand that holds the flexible tube. Thus, the insertion unit is passed the elbows. Consequently, the distal section 121 of the insertion unit 102*a* is, as indicated with an arrow, inserted into the main pipe.

As mentioned above, the insertion unit of the endoscope comprises the distal section, the bending section, the flexible tube which adjoins the bending section and whose outer diameter is smaller than the outer diameter of the bending section, and the guide tube that can freely slide on the periphery of the flexible tube and can be freely detachably attached to the bending section. Consequently, the insertion unit can be inserted with the guide tube integrated with the bending section. Moreover, when the flexible tube is held, the insertion unit can be inserted deeper with the flexible tube thrust out of the distal end of the guide tube.

Moreover, the bosses whose distal portions are shaped substantially like a hemisphere are formed on the external surface of the tube body included in each of the flexible tube and guide tube. This diminishes the resistance occurring between the guide tube and the internal surface of a pipe, between the flexible tube and the internal surface of the guide tube, or between the flexible tube and the internal surface of a pipe. Consequently, the efficiency in inserting the insertion unit improves.

Incidentally, according to the present embodiment, the tube body included in each of the flexible tube and guide tube is formed with one tube body. Alternatively, the tube body may be, as shown in FIG. 17A and FIG. 17B, formed by joining a plurality of tubes 161, 162, etc. Specifically, the plurality of tubes 161, 162, etc. may be joined through bonding or soldering with a pipe fitting 160 mounted on adjoining ones of the tubes in order to form a flexible tube 123A and a guide tube 124A having predetermined lengths.

Moreover, referring to FIG. 17A and FIG. 17B, the tubes 161, 162, etc. are joined with the pipe fitting mounted on the peripheries of adjoining ones of the tubes. Alternatively, the tubes 161, 162, etc. may be joined with the pipe fitting locked in adjoining ones of the tubes.

Furthermore, when the plurality of tube bodies is joined in order to form a guide tube, a plurality of tube bodies 151*a*, 151*b*, and 151*c* having different diameters may be, as shown in FIG. 18A, joined in order to produce a guide tube 124B whose diameter diminishes towards the distal end thereof. Otherwise, a plurality of tube bodies 151*d*, 151*e*, and 151*f* having different diameters and different lengths may be, as shown in FIG. 18B, layered in order to produce a guide tube 124C. Thus, a guide tube that tapers off to the distal end thereof can be produced.

The guide tube 124C structured as shown in FIG. 18B has the flexibility thereof increased from the distal end to the proximal end, that is, gets harder from the distal end to the proximal end. Consequently, the efficiency in inserting the insertion unit 102*a* with the guide tube 124C held is improved.

Furthermore, as shown in FIG. 19A to FIG. 20B, when the insertion unit 102*a* is wound about the external surface of the drum 103A or 103B, the proximal end of the guide tube 124 and the proximal end of the flexible tube 123 are fixed to the drum 103A or 103B at mutually different positions on the drum 103A or 103B using locking members 170. Moreover, two portions of the drum 103A or 103B can be rotated independently of each other as indicated with a dashed-line arrow and a solid-line arrow so that the flexible tube 123 alone or both the flexible tube 123 and guide tube 124 can be moved.

Consequently, the insertion unit can be inserted with the guide tube integrated with the bending section, or the insertion unit can be inserted deeper with the flexible tube thrust out of the distal end of the guide tube.

Moreover, the portion of the insertion unit 102a proximal to the distal section 121 may be structured as shown in FIG. 21. Specifically, a soft bending section 171 is joined to a braid tube 172 that is slightly harder than the bending section 171, and the braid tube 172 is joined to a coiled tube 173 that is slightly harder than the braid tube 172. Consequently, the flexibility of the insertion unit 102 is varied gradually from the distal end thereof to the proximal end thereof, that is, the insertion unit 102 gets harder from the distal end thereof to the proximal end thereof. This leads to the improved efficiency in inserting the insertion unit.

In the fluid pressure actuator 140, the communication members 149 are, as shown in FIG. 14, located at predetermined positions in the multi-lumen tube 141. At this time, if, for example, the fluid compartment 141a is allowed to communicate with the insertion unit-side tube 142a, the communication member 149 is fitted into the end of the fluid compartment 141a with pressure. Consequently, the diameter of the end of the multi-lumen tube 141 near the communication member 149 increases. This makes the insertion unit 102a thicker.

Figure 22A:
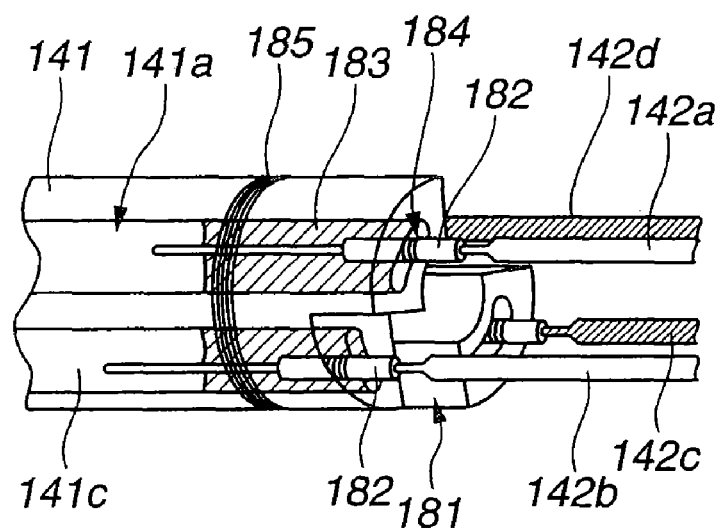
FIG. 22A shows the structure for joining fluid compartments and insertion unit-side fluid supply tubes via stepped communication members.

Therefore, as shown in FIG. 22A, a stepwise portion 181 is formed at the end of the multi-lumen tube 141 in order to prevent interference among stepped communication members 182. The stepped communication members 182 are fixed or bonded to the ends of the respective fluid compartments 141 using an adhesive 183. The insertion unit-side tubes 142a are joined or fixed to the stepped communication members 182 using a first winding fixture 184. The stepped communication members 182 are integrated with the end of the multi-lumen tube 141 using a second winding fixture 185. Consequently, the diameter of the end of the multi-lumen tube 141 is reliably prevented from increasing.

Figure 22B:
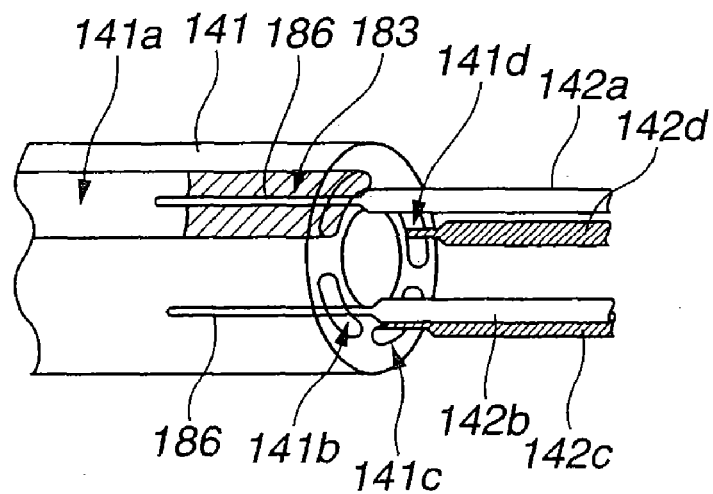
FIG. 22B shows the structure for directly joining the fluid compartments and the insertion unit-side fluid supply tubes.

Moreover, as shown in FIG. 22B, the distal portions of the insertion unit-side tubes 142a, 142b, 142c, and 142d may be formed as small-diameter portions 186. The small-diameter portions 186 may be fixed or bonded to the multi-lumen tube 141 as integral parts of the multi-lumen tube 141 at predetermined positions on the multi-lumen tube 141 using the adhesive 183, so that the fluid compartments will communicate with the insertion unit-side tubes. This can also reliably prevent the diameter of the end of the multi-lumen tube 141 from increasing. Incidentally, the small-diameter portions that are the distal portions of the insertion unit-side tubes are produced by utilizing the property of the material made into the tubes. Specifically, the distal portions of the insertion unit-side tubes may be molded or stretched in the longitudinal direction to a predetermined extent.

The preferred embodiments of the present invention have been described with reference to the accompanying drawings. It should be understood that the present invention is not limited to those precise embodiments but any skilled person in the art can make various changes or modifications without departing from the spirit or scope of the invention defined in the appended claims.

What is claimed is:

1. An endoscope system comprising:
   an endoscope having an elongated insertion unit comprising adjoining bending and distal sections; and
   a guide member for guiding the insertion unit, the guide member having proximal and distal guide member ends and including a plurality of tubular members having varying outer diameters, each tubular member of the plurality of tubular members having proximal and distal ends, a guide channel of a predetermined inner diameter permitting passage of tubular members having smaller outer diameter and the insertion unit, a predetermined degree of flexibility, a predetermined length, and a direction changing unit operative to change an advancing direction in which tubular members having smaller outer diameter and the insertion unit are advanced through the guide channel, the guide member is adapted to be passed through or placed in a pipe,
   wherein the direction changing unit is a distal cover member attachable to the distal end of the tubular member; the distal cover member having a passing direction changing opening formed in a lateral side of the distal cover member; and the passing direction changing opening changes the passing direction, in which the insertion unit is passed, from an axial direction of the tubular member to a lateral direction thereof 2. An endoscope system according to claim 1, wherein the distal cover member attached to the distal end of the tubular member and serving as an extremely distal portion of the insertion unit guide member includes a leading direction adjusting unit for adjusting the leading direction in which the insertion unit is led out of the passing direction changing opening.

3. An endoscope system according to claim 2, wherein the leading direction adjusting unit comprises:
   a raiser located distally to the passing direction changing opening of the distal cover member; and
   an operation wire having a wire distal end fixed to the raiser and a wire proximal end extended towards the proximal guide member end.

4. An endoscope system according to claim 3, wherein the tubular member comprises a tube and a braid for sheathing a periphery of the tube; and the operation wire being interposed between the tube and the braid and extended towards the proximal guide member end.

5. An endoscope system comprising:
   an endoscope having an elongated insertion unit comprising adjoining bending and distal sections; and
   a guide member for guiding the insertion unit, the guide member having proximal and distal guide member ends and including a plurality of tubular members having varying outer diameters, each tubular member of the plurality of tubular members having proximal and distal ends, a guide channel of a predetermined inner diameter permitting passage of tubular members having smaller outer diameter and the insertion unit, a predetermined degree of flexibility, a predetermined length, and a direction changing unit operative to change an advancing direction in which tubular members having smaller outer diameter and the insertion unit are advanced through the guide channel, the guide member is adapted to be passed through or placed in a pipe,
   wherein an observational optical system and an illumination optical system are incorporated in the distal section of the insertion unit,
   a flexible tube adjoins the bending section, the flexible tube including a metallic braid and a tube body integrated thereinto, and having a smaller outer diameter than the bending section; and
   a guide tube having a metallic braid and a tube body integrated thereinto and having an outer diameter that is substantially identical to an outer diameter of the bending section mounted on a periphery of the flexible tube included in the insertion unit so that the guide tube can slide freely.

6. An endoscope system according to claim 5, wherein the insertion unit includes an attaching/detaching means for attaching the flexible tube to the guide tube so that the flexible tube can be freely detached from the guide tube.

7. An endoscope system according to claim 6, wherein the attaching/detaching means is an elastic member that comes into close contact with an external surface of a base, which joins the bending section and the flexible tube, with a predetermined holding force.

8. An endoscope system according to claim 5, wherein a plurality of bosses having distal portions shaped substantially like a sphere is formed on an external surface of the tube body included in each guide tube and flexible tube.

* * * * *